United States Patent
Fisher et al.

(10) Patent No.: US 7,225,156 B2
(45) Date of Patent: May 29, 2007

(54) PERSISTENT DYNAMIC PAYMENT SERVICE

(76) Inventors: Douglas C. Fisher, 1121 Bruckner Cir., Mountain View, CA (US) 94040; Kenny Lo, 1872 Hanna Dr., Cupertino, CA (US) 95014

( * ) Notice: Subject to any disclaimer, the term of this patent is extended or adjusted under 35 U.S.C. 154(b) by 682 days.

(21) Appl. No.: 10/066,174

(22) Filed: Jan. 29, 2002

(65) Prior Publication Data

US 2003/0126094 A1  Jul. 3, 2003

Related U.S. Application Data

(60) Provisional application No. 60/304,819, filed on Jul. 11, 2001.

(51) Int. Cl.
G06Q 99/00 (2006.01)
(52) U.S. Cl. ............... 705/50; 705/75; 705/39; 705/42; 709/217; 235/379
(58) Field of Classification Search ............ 705/40, 705/39, 44, 75, 42; 455/410; 713/153; 235/379; 709/217
See application file for complete search history.

(56) References Cited

U.S. PATENT DOCUMENTS

| | | | | |
|---|---|---|---|---|
| 6,000,832 | A | 12/1999 | Franklin | 364/479.02 |
| 6,029,151 | A | 2/2000 | Nikander | 705/39 |
| 6,327,578 | B1 | 12/2001 | Linehan | 705/65 |
| 7,080,048 | B1 * | 7/2006 | Sines et al. | 705/75 |
| 2002/0016769 | A1 * | 2/2002 | Barbara et al. | 705/40 |

FOREIGN PATENT DOCUMENTS

| | | | |
|---|---|---|---|
| GB | 2371639 A | * | 7/2002 |
| WO | WO 00/49586 A1 | | 8/2000 |

OTHER PUBLICATIONS

Commerce at the speed of light. Joe Rudich, Nov. 1996, Lan Magazine, vol. 11, No. 12.*
"Transale: A Simple Solution for e-payment security and authorization", originally published in PC Magazine, Jul. 2000, downloaded from http://www.transale.com/pcmagazine.htm on Mar. 10, 2002 (3 Pages).

(Continued)

Primary Examiner—James P. Trammell
Assistant Examiner—Behrang Badii
(74) Attorney, Agent, or Firm—Howard E. Lebowitz

(57) ABSTRACT

The invention comprises online methods, systems, and software for improving the processing of payments from financial accounts, particularly credit and debit card payments made from consumers to merchants in online transactions. The preferred embodiment of the invention involves inserting a trusted third party online service into the payment authorization process. The trusted third party authenticates the consumer and authorizes the proposed payment in a single integrated process conducted without the involvement of the merchant. The authentication of the consumer is accomplished over a persistent communication channel established with the consumer before a purchase is made. The authentication is done by verifying that the persistent channel is open when authorization is requested. Use of the third party services allows the consumer to avoid revealing his identity and credit card number to the merchant over a public network such as the Internet, while maintaining control of the transaction during the authorization process.

8 Claims, 22 Drawing Sheets

OTHER PUBLICATIONS

"Telemoney—How it Works", downloaded from http://www.telemoneyworld.com/howitworks.shtml on Mar. 10, 2002 (1 page).

"E-Payment Security", downloaded from http://www.globeid.com/products/@payvault.htm on Sep. 16, 2001 (8 page document, pp. 5 and 6).

Article entitled "transale: A simple solution for e-payment security and authorization", PC Magazine, Jul. 2000, downloaded from http://www.transale.com/pcmagazine.htm on Mar. 10, 2002 (3 pages).

Web Page downloaded from "http://www.telemoneyworld.com/howitworks.shtml" on Mar. 10, 2002 (1 page).

Whitepaper entitled "E-Payment Security" downloaded from "http://www.globeid.com/products/@payvault.htm" on Sep. 16, 2001. (6 page document; pp. 5 and 6).

\* cited by examiner

Intranet Configuration:

e-Service Configuration:

PERSISTENT DYNAMIC PAYMENT SERVICE

This application claims the benefit of provisional application Ser. No. 60/304,819 filed on Jul. 11, 2001, which is hereby incorporated by reference herein, and specifically references Disclosure Document SV01391 dated May 22, 2001 and titled Virtual Intermediated Payment Service.

BACKGROUND OF THE INVENTION

1. Field of the Invention

The invention pertains to online methods, systems and software for improving the privacy, anonymity, security and control of cardholders over their private financial and personal information in making online payments in a transaction over a network where online e-commerce transactions are carried out, such as the Internet.

2. Background of the Prior Art

Security, privacy, and anonymity have become major issues in e-commerce transactions. The e-commerce concept depends on the premise that it is possible to access a purchaser's financial accounts for payments in a manner that will provide purchasers with the confidence to participate and make purchases while dealing with a remote merchant in an online transaction. The purchaser making a payment is currently faced with a very rigid system where a credit card number must generally be supplied along with other personal information to make a purchase. Once the information is provided the payer loses control completely, until under ideal circumstances, the payer learns that the transaction has been properly executed. Yet, deficiencies of the system are well known, including the following:

1. theft of a purchaser's financial information enabling the recipient of the financial information to conduct fraudulent transactions,
2. lack of dynamic ability to review, reconsider, and even modify aspects of a transaction after the "buy" button is clicked on the merchant's site literally during the payment process,
3. lack of flexibility in structuring a payment among various accounts of different types (e.g., credit cards, debit cards, checking accounts, and etc.),
4. lack of privacy—the merchant has access to the payer's name, billing address, credit card number and other personal information which may be correlated against purchases and even sold to third parties, and
5. merchant records associated with online transactions are a concentrated financial information target for organized attack by criminals and terrorists.

Methods of conducting e-Commerce transactions wherein a buyer (payer) pays for goods or services obtained from a merchant (recipient) with a credit card in an online transaction over a computer network, such as the Internet, are well known in the prior art. While there are variations, the existing process for making such a transaction is that the payer enters a credit card number, billing address and other information needed for authorization of the payment onto a form on the web site to pay for an e-commerce transaction. The credit card number and the other information are transmitted over the Internet from the payer to the web site generally in an encrypted form such as SSL. The merchant site translates the information into a standard inter-bank protocol and forwards the information to a financial institution, usually known as the merchant's Acquiring bank, with which the merchant has an existing relationship generally over secure lines. The Acquiring bank forwards the transaction to the issuer of the credit card, generally known as the issuing bank, over a secure inter-bank payment network based on routing information which is part of the credit card number. The issuing bank either approves or denies the proposed transaction and returns the decision to the merchant through the Acquiring bank.

The prior art SET Secure Electronic Transaction™ (trademark and service mark owned by SET Secure Electronic Transaction LLC) protocol has been developed jointly by the Visa and MasterCard card associations as a method to secure credit card transactions over public networks such as the Internet. SET provides message integrity, authentication of all financial data, and encryption of sensitive data. SET is a three party protocol involving a cardholding consumer (buyer), a merchant and a gateway operating on behalf of an acquiring bank. The gateway is an addition to the model described above which intermediates between the merchant and the acquiring bank communicating with the merchant over the public network (Internet) and the acquiring bank over a private network. The scheme is complex, and depends on many participants conforming to a new process specification.

Another class of approaches towards improving the processing of online credit transactions includes issuance of one time or limited time pseudo card numbers by a bank which issues credit cards to its cardholders. These approaches protect the credit card numbers because the pseudo number is used in place of the actual card number. Valid credit card numbers contain routing information which identifies the issuing bank and allows transactions to be routed to the issuing bank for approval. In one-time or limited time approaches a cardholder's issuing bank establishes a method of issuing numbers containing the bank's routing information and a temporary pseudo card number which has been correlated to the cardholder's valid account number. Pseudo card numbers have less potential for misuse because of their limited duration and thus improve security. However, the approach is linked to implementation by a cardholder's issuing bank, so that a cardholder must enter into a different arrangement with the issuer of each account. The approach is also limited to protection of the credit card number but not protection of the privacy of the cardholder himself The approach similarly does not provide dynamic control during payment processing of the transaction.

Examples of one-time/limited time approaches include Wong, U.S. Pat. No. 5,956,699, which deals primarily with a method of generating an account number and permutation of the number for successive uses. Austin, U.S. Pat. No. 6,029,890 deals with a system for using a single use credit card number. Franklin, U.S. Pat. No. 6,000,832 discloses a form of one time account number where a unique account number is generated for each transaction by the user's computer according to an algorithm involving a base account number, a private key, and user specific data. Similar systems are U.S. Pat. Nos. 5,937,394 and 5,913,203.

Other approaches include Pearson, U.S. Pat. No. 6,023,684, which is a three tier financial transaction system having a local data memory. The system facilitates consumer access to financial institution records to service consumer transactions such as bill paying, retail banking, and credit card account support. Rosen, U.S. Pat. No. 5,745,886 discloses a system for a secure transaction between a customer and a merchant for the open distribution of electronic money between a customer trusted agent and a merchant trusted agent, each with an associated money module. U.S. Pat. No. 5,978,840 discloses a system, method and article of manufacture for a payment gateway system for processing encrypted transactions utilizing a multichannel, flexible architecture. These approaches deal primarily with new systems and methods for secure transactions and do not provide a cardholder with an improved means of payment over existing payment systems.

Another new type of bankcard processing system for online transactions is described by Linehan in U.S. Pat. No. 6,327,578. Lineham discloses a four party protocol intended to improve on the SET protocol by adding a fourth party to the three party SET protocol, an issuer gateway operating on behalf of a cardholder's issuing bank and moving the credit/debit card authorization process from the merchant to the issuing bank. The issuer gateway communicates with the cardholder's computer over the Internet and with the issuing bank over a private network. The communication between the cardholder's computer and the issuer gateway is initiated by message from the merchant that starts a wallet in the cardholder's computer. The initiation message includes a merchant digital signature and a digital certificate from an Acquiring bank as well as a payment amount, an order description, a time stamp and a nonce. Approval of the transaction is made by the issuing bank without real time involvement of the Acquiring bank. When approved an authorization is sent to the merchant either directly or via the cardholder. Upon receipt and verification of the authorization, the merchant completes the transaction with the cardholder. At a later time, the merchant requests the acquirer gateway to capture the transaction and arrange for settlement through the Acquiring bank. Linehan's method achieves improved privacy and security for the cardholder because the cardholder's sensitive information is not passed through the merchant, and because once the four party protocol is in place, various issuers may choose various different methods of authentication without the need to change the acquirer gateway. However, the challenge to adoption of Linehan's invention is that unlike today's situation where virtually any cardholder with browser access to the Internet can complete a transaction with virtually any merchant, Lineham requires that all four parties to a transaction (consumer, merchant, Acquiring bank, and Issuing bank) must have adopted the protocol to complete a transaction. The protocol involves a new method of online bankcard transactions and does not appear to contemplate use with the existing infrastructure.

There is a need for methods and systems for improving the security of financial account payments in online transactions between a payer and a beneficiary which will protect consumers, merchants, and financial institutions from misuses and criminal, and terrorist attacks.

There is a need for improved methods and systems for eliminating misuse of a payer's financial information associated with online payment transactions.

There is a need for improved methods and systems for protecting a payer's privacy in online payment transactions.

There is a need for improved methods and systems for giving payers dynamic control over online payment transactions between the time of submission of the payment information to the beneficiary and approval by the payer's financial institution.

There is a need for accomplishing the above within constraints of the existing account processing methods and systems in use today for processing online payments.

SUMMARY OF THE INVENTION

The instant invention comprises systems, software and online methods which offer online users privacy, anonymity, security and control over their private financial data while making electronic payments as part of transaction over networks such as the public Internet or private networks. In particular, embodiments of the invention improve the existing methods and systems for making and authorizing payments during e-commerce transactions and payments between peers.

A preferred embodiment relates to a method of making credit card payments from a payer to a recipient in a web based transaction, typically a buyer using a credit card to make an online purchase from a merchant's Internet web site. While there are variations, the existing core process in making such a transaction is that the payer enters a credit card number, billing address and other information needed for authorization of the payment onto a form on the web site to pay for an e-commerce transaction. The credit card number and the other information are transmitted over the Internet from the payer to the web site generally in an encrypted form such as SSL. The merchant site translates the information into a standard inter-bank protocol and forwards the information to a financial institution, usually known as the merchant's Acquiring bank, with which the merchant has an existing relationship generally over secure lines. The Acquiring bank forwards the transaction to the issuer of the credit card, generally known as the issuing bank, over a secure inter-bank payment network based on routing information which is part of the credit card number. The issuing bank either approves or denies the proposed transaction and returns the decision to the merchant through the Acquiring bank.

The issuing and processing of financial accounts is generally done by banks. However, when the word bank or financial institution is used herein it is meant to include any entity which can perform the requisite act in question, such as issuing and accepting credit cards, debit cards or checking accounts, or processing transactions in whole or in part involving transactions utilizing these accounts. Users, payers, or cardholders refer to the party making a payment and may be individuals or corporations. Any of these terms may refer to the party who actually owns the account or some other party using the account for the actual owner. In the case of online payments these terms could also refer to web connected automated software applications or software operated hardware devices acting on behalf of an individual or corporation.

An improvement according to one preferred embodiment of the invention is to provide a trusted third party service known as a Persistent Dynamic Payment Service (PDPS) which links a network on which online e-commerce transactions are being carried out between payers and merchants, typically a public network such as the Internet, and a private inter-bank payment network. A payer is assigned a proxy account number which is syntactically identical with a standard credit card number, so it is indistinguishable from a real card number to the merchant. The proxy account number includes routing information which causes it to be directed to a Payment Processor which is a financial institution which is part of the inter-bank payment network and serves as the PDPS's gateway to the payment network. The Payment Processor is typically a bank, or an association such as VISA or MasterCard. The PDPS may be fully integrated with the Payment Processor or external with a secure communications link or partially integrated.

The PDPS, in the above preferred embodiment, includes a database which associates the payer's proxy account number with one or more valid account numbers. A valid account number is an account number which corresponds to an actual financial account. The financial accounts may be of any type which can be processed and settled either directly or indirectly by the Payment Processor, typically credit cards, debit cards, and checking accounts. The database also includes other data needed to complete the transaction, typically a proxy and valid cardholder name and billing address for credit cards and a PIN for debit cards. The database preferably also includes user preferences which include advanced preferences for completing transactions. The PDPS includes functionality for making and updating entries in the database.

The PDPS in this preferred embodiment communicates with the payer through a portal which is accessible to the user on the network where the online transaction will be carried out, and provides the payer with agent software for establishing a persistent channel with the portal and for otherwise exchanging information with the portal over the persistent channel. A persistent channel is a two way electronic communication with the PDPS, which is different from the channel used to communicate with the merchant, or in the case of multiple transactions, merchants, and which once opened is available for communication and verification until terminated. In the previously described preferred embodiment, the persistent channel is available over the network where the on-line transaction takes place. However, this is not a general requirement. For instance a persistent channel may be available on a secure VPN, while the merchant-payer interaction takes place on the Internet. The persistent channel may be implemented in data, voice, and video networks. Also, the two directions of communication over the persistent channel also need not be a single physical channel. For example, by a prearranged preference, a payer could initiate a channel from a computer system, with replies set to come to a PDA. A persistent channel remains open until closed. A channel may be closed by an action taken over the persistent channel or by a time out after a predetermined time.

It follows that a persistent channel is capable of remaining open across a number of transactions. Thus in online shopping a user may open the persistent channel and allow it to remain open during a plurality of transactions involving a plurality of merchants.

Before making an online purchase, involving a payment from a financial account, such as a credit card, a persistent channel is established by the payer contacting the PDPS either directly or indirectly, or in some embodiments by the PDPS contacting the payer. The agent software provides for authentication of the user (such as by entering a PIN or using PKI technology) and establishing a persistent channel between the user and the PDP Portal. When the payer has decided to make a purchase from a merchant, the proxy account number is entered in the merchant's online form in the place for a card number along with other required information such as the user name and address. The other information entered may be the payer's actual data, fictitious data or a persona pre-arranged with the PDPS. In one embodiment the agent software automatically fills in the merchant's form in the manner of an e-wallet in accordance with the user's instructions entered at purchase time or predefined preferences based on data about the payer in the database. Upon completion, the payer depresses the 'buy' button on the merchant's site.

Since the proxy credit card number is syntactically identical with a standard credit card number the merchant processes it as a proposed payment in the customary manner, wherein it is converted to a standard inter-bank protocol such as ISO 8583. Based on the routing information embedded in the credit card number, the Acquiring bank sends along an authorization request for the proposed payment to what it believes to be the card's issuing bank but what is actually the PDPS's Payment Processor. The Payment Processor routes the request to the PDPS, which comprises functionality for processing the request in the standard inter-bank protocol. The PDPS queries the database to obtain the valid account numbers and payer preferences associated with the proxy account number and verifies whether the persistent channel is available. The PDPS uses its software functionality to compare the proposed payment to the preferences found in the database. Depending on the preferences, in addition to the persistent channel being available the payment may require additional verification from the payer. If so, the PDPS contacts the payer real time over the persistent channel. Additional verification preferably includes such useful options as choosing which valid account to use for a purchase, if more than one valid account is associated with the proxy account number, or splitting the proposed payments between more than one valid account, or entering a PIN number. In the course of the additional verification the merchant's name and purchase amount are preferably displayed to the payer.

If the payment is verified, the PDPS prepares one or more requests according to the standard inter-bank protocol as determined by the payer's instructions, for approval by the issuing banks of the valid accounts. These requests contain the actual valid account numbers and payer data taken from the database. The requests are forwarded to the Payment Processor who forwards them to the accounts' issuing bank for processing. If the transaction is approved the response containing the approval code is forwarded to the Payment Processor. The Payment Processor passes the response to the PDPS which places it in correct form to meet the expectations of the merchant's Acquiring bank and returns it to the Payment Processor. The Payment Processor forwards a proper response to the merchant's Acquiring bank.

It is important to note that the operation of the PDPS does not require participation of the merchant in any way beyond the normal process of submitting an authorization request to its Acquiring Bank. In order to preserve the privacy of the cardholder, it is preferred that the existence of the PDPS be unknown to the merchant during the transaction.

Embodiments of the invention have thus far been described as using proxy account numbers which are assigned to users and are mapped against users' valid account numbers and other credentials in the PDP database. In order to be able use the existing infrastructure for processing account transactions, it is preferable that an improvement enter a syntactically correct card number with routing information which will cause a transaction involving the number to be forwarded to the Payment Processor. However, in online transactions according to the instant invention, a payer authenticates to the PDPS over the persistent channel before a transaction is completed with a merchant, and the transaction is validated using the persistent channel after the transaction is completed with the merchant. Therefore, as long as the routing information on the proxy account number identifies the Payment Processor, the remainder of the account number entered on the merchant's form need not be the information which uniquely identifies the payer. The identifying information can be anywhere on the information which the payer enters. As an example, identifying information could be entered on the address field. Further, in some embodiments of the invention the PDP gains contemporaneous access to the entry of data onto the merchant's input form via the persistent channel. In those embodiments, the PDPS may link the payer's identity to the contents of a particular order at the time the order is created on the merchant's site, so that the transaction will be recognized and the payer known to the PDPS when the authorization request comes through for approval. In this case the PDP database preferably maps a user identifier that is also used for authentication against the user's valid account numbers and other credentials.

It will be apparent that there are many advantages to a payment made according to the above method as follows:

1. The credit card number and billing address transmitted to the merchant is not useful in itself without the persistent channel between the PDPS and the authenticated user. In fact, the actual account to be used is not knowable until it is determined from the PDP database after the persistent channel is verified. In the case where more than one actual accounts are mapped to a proxy account, the choice will be based on real time communication or predetermined preferences. The choice of actual accounts is preferably made with reference to a descriptive name and does not require transmission of the account number over an insecure network.
2. A misappropriated credit card number is not useful even by someone having both the number and the owner's billing address.
3. It is not necessary to regularly change the proxy account number to gain the improvement in security.
4. The system is easy to use, comparable to an e-wallet, and does not require software or process changes to merchants, Acquiring banks, or payment networks.
5. Since the persistent channel is persistent it is not necessary to authenticate after each transaction, the availability of the channel is maintained until closed between transactions and merchants.
6. The method is dynamic. In the prior art, the payer's control ends when the payment button is pushed on the merchant's site. In a method and system according to the instant invention, the payer maintains control while the transaction is in the hands of the PDPS. It is possible to review the transaction and stop a transaction containing an error. It is also possible for the payer to split a payment between two or more accounts, even accounts of different types such as a credit card and a checking account. In one embodiment, the system is configured to offer the payer a "second chance" to choose a new account when the issuing bank denies approval.
7. The method supports the multiple channels a payer will typically utilize for purchases. For example, mail order purchases initiated via phone, in store purchases with a physical purchase card, and Internet purchases.
8. High levels of privacy are achieved since PDPS separates identity information from transactional information. The merchant and Acquiring bank have no knowledge of the payer's valid identity. The issuing bank could have no knowledge of the purchased item or service, if the user specified that the—transaction description be replaced by a proxy description.

The invention has been described thus far in terms of the convenience and protections provided to a user of the service. However it will be readily apparent to those skilled in the art that when widely implemented the invention improves the stability and security of the entire credit and payment system against organized attack by organized crime elements and terrorists. For instance automated credit and payment transactions are such a significant part of the economy that a substantial disruption of the banking system and the national economy could be created by a concerted misuse of credit card information obtained from merchant sites, or credit card receipts, by organized crime elements and terrorists. The instant invention would make the card information thus obtained essentially useless, by basing payment approval on direct contact with the card holder.

There are alternatives for how a payer enrolls in the PDPS, obtaining a proxy account number, providing personal information and preferences, and receiving authentication codes. The enrollment may take place on line by a payer registering with the PDPS on the PDPS web site. Enrollment may also take place off-line as through the mail. Alternatively some combination of these are possible. Another alternative is for an issuing bank to enroll its existing customers as members, thereby eliminating the payers need to self-enroll. An advantage of this approach is that there is no need to verify the customer's information. In the case where an aggregator such as AOL arranges with a bank to together operate as a Payment Processor, additional validation of the account information entered by the cardholder needs to be performed. The PDPS can verify a cardholder identity using various methods. The PDPS can verify the cardholder identity through a third party authentication database. Alternatively, an authorization for one dollar can be submitted through the Payment Processor to the cardholders issuing bank. The PDPS can then validate the account status, the cardholders billing address, etc.

In one attractive embodiment, the proxy account number is also a valid account number of an actual account, when the actual account is issued by the Payment Processor (i.e. the issuing bank is the Payment Processor). An attractive embodiment involving such a card involves configuring the user preferences to use an online persistent channel for verification of online purchases over the Internet or and verifying off line transactions over the telephone, a PDA (Personal Digital Assistant), or other mobile device, either over the public network or ordinary telephone. Telephone verification could be accomplished by the payer opening a persistent channel on the telephone by making a connection and authenticating to the PDPS. An alternative, is to activate the account for payments, by making a connection over the phone and authenticating, and later to similarly deactivate the account, that is once opened the persistent channel in this alternative remains open until closed. Another alternative is for the PDPS to contact the payer by phone to confirm the payment. In this embodiment the persistent channel is initiated by the PDPS. Other methods of confirmation over the phone or other devices will be apparent to those skilled in the art. Another alternative, is for the card to functional traditionally for card present transaction (i.e. no PDPS involvement), but for card not present transaction, PDPS's verification would be invoked.

As previously noted, this latter embodiment, where the issuing bank is also the Payment Processor, is also an effective way for the issuing bank to provide a very high level of security and stability against organized attack by terrorists or organized crime elements.

Another embodiment of the PDPS is in peer to peer transfer of funds from a payer to a receiver. Banks are beginning to offer a very convenient service wherein a payer can effect an immediate transfer of funds between accounts in two FDIC banks through the debit card system. The service is offered as an Internet web service. As currently structured the payer logs into the service and authenticates. The payer then must enter the receiver's debit card number and the amount of the transfer. The transfer request is then forwarded from the payer's bank to the receiver's bank by an intermediary payment Processor such as an ATM association such as NYCE. However, there is great reluctance on the part of potential receiving parties to distribute their debit card number. In this case it is the receiver's privacy that is protected by the PDPS in the improvement according to the invention. Potential fund receivers obtain proxy debit card numbers in the syntax of a real debit card number. The routing information on the proxy debit card number allows a request for authorization to be routed to the PDPS as the receiver's bank. The PDPS maintains a database associating the proxy debit card number with at least one valid debit card number and optionally receiver preferences. If there is more than one valid debit card number associated with the proxy debit card number, the preferences specify rules for which account to credit. When a request is received, the PDPS uses the data base entries and preferences to find the valid debit card number that should be credited. A request is forwarded to the payment Processor in the inter-bank protocol and is forwarded to the receiver's bank for crediting to the receiver's account. The transaction is completed without revealing the receivers debit card number.

A PDPS may be offered in an intranet configuration, where the PDPS is filly integrated with the Payment Processor's application. In an alternative e-service configuration, the Payment Processor and PDPS reside in different networks but are connected through a secure link.

A preferred PDPS implementation comprises agent means, portal means, server means, and database means. The functionality of the PDPS can be distributed in many ways among the components. The PDPS system comprises at least one computer server and software executing thereon to accomplish the functions of the PDPS. The agent provides the payer with functionality to authenticate to PDPS, and communicate with a PDPS web portal. In a preferred embodiment the agent is embedded into the PDP Portal, such that it will be transferred and active once the user signs on with the portal. Since the agent is part of a Web page, there is no need to manage software version upgrades for the agent outside what's already supported in the standard Web browsers available commercially. Alternative embodiments allow for the agent to be separate software on the payer's computer.

The PDP Portal comprises the management console for both payers and PDPS system operators (SO). It provides a Web interface, e.g. HTML/XML/Javascript, accessible through standard Web browsers. The payers use the Portal to change their PDP user preferences. The system operators use it to effect system or account-wise changes via the system preferences table. The PDP Portal maintains an internal table that keeps track of current user connections and provides access to this table through a messaging protocol used by the PDMP components for communication.

The PDP Server is an application server which comprises functionality which maps the proxy account number to actual credit account according to user's stored rule preferences. It is an application server component residing in the secure network of a typical bank environment. The server has access to users' stored profiles, as well as access to the Payment Processor's gateway to process incoming and outgoing payment transactions.

The Server comprises functionality to connect to the PDP Portal and to look up the currently live communication channel to payer's PDP Agent, via the messaging protocol. It further comprises functionality to listen on a pre-set port for messages with content comprising the inter-bank protocol, receiving authorization requests, decoding them and interpreting them according to rules, comprising payer preferences.

The PDP Database is the vault for user's data, comprising e-wallet, personas, preferences, user connections and security credentials. The Database can be divided into separate databases, e.g. one for user data and another for connections table.

It is an object of the invention to provide a secure method, system and software which enables a purchaser to make on line payments from a financial account such as a credit card, debit card, or checking account in an e-commerce transaction over the Internet.

It is a further object of the invention to provide a secure and convenient method, system and software which enables a purchaser to make on line payments from a financial account such as a credit card, debit card, or checking account, wherein the purchaser's account number and other confidential information need not be transmitted over the Internet or revealed to a merchant in an e-commerce transaction with the merchant.

It is a still further object of the invention to provide a secure and improved method system and software for using credit and debit cards for payment in online transactions which prevents transmitting a purchaser's confidential information over the Internet or revealing it to a merchant, wherein the method, system and software can be used by adding the improved system into the existing approval infrastructure, without modification.

It is a still further object of the invention to provide an improved method, system and software for making payments in online transactions which provides a high level of security and stability against organized attack on the payment system by terrorists or organized crime.

It is yet a still further object of the invention to provide a financial account user with dynamic alternatives in the processing of an online payment after completion of the transaction on an e-commerce site.

DESCRIPTION OF THE PREFFERED EMBODIMENTS

Figure 1:
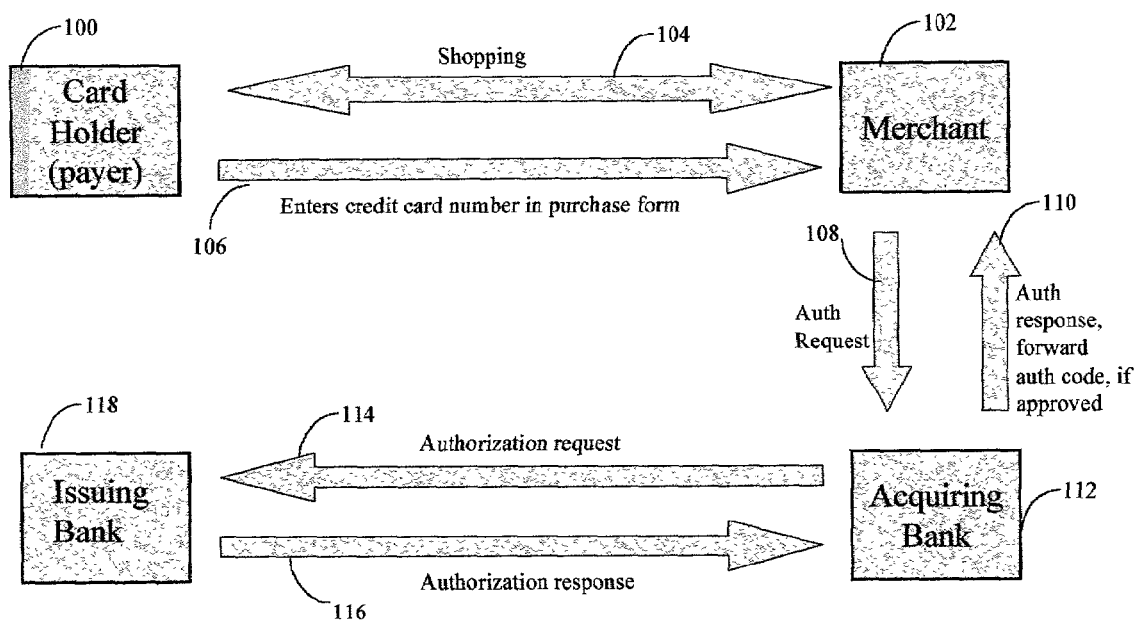
FIG. 1 is a process flow diagram illustrating conventional processing of a credit card transaction in an online e-commerce transaction.

The instant invention comprises improved systems, software and online methods for making payments from financial accounts such as credit cards, debit cards, checking accounts which represent assets or credit. Preferred embodiments are presented for methods and systems for making and authorizing payments during e-commerce transactions, as those between a consumer and a merchant and payments between peers.

Overview of the Online Methods

The invention pertains to the use of financial accounts for making payments. Financial accounts may include accounts where the payment represents value, such as savings accounts, checking accounts, and debit accounts (which access underlying savings and/or checking accounts) and accounts which represent credit, such as credit cards. All of these accounts have account numbers which are issued in a common syntax, which identifies the issuing institution and its routing information, usually directly or indirectly a commercial bank, and the account (and usually the accountholder). Transactions involving these accounts can and usually are authorized and settled between two banks one bank representing the payer and the other representing the beneficiary. These transactions are generally made over an inter-bank payment network which operates according to an established protocol and route the transaction based on the account number routing information. The transactions are usually automated electronic transactions over a very secure network. For the purposes of this invention, any account which functions and is processed as described can be a financial account. Further any institution which performs one of the functions of a bank involving financial accounts, such as issuing accounts, maintaining accounts, or processing account transactions acquired by merchants, is a bank in the context of this invention, whether or not the underlying legal entity is actually a commercial bank.

Embodiments of the invention are particularly useful for making payments in e-commerce transactions over a public network, such as the Internet, or over private networks where similar transactions are carried out. Transactions are made using network accessible devices, which comprise computing devices such as computer systems, Personal Digital Assistants, network enabled wireless telephones, set top boxes, and special purpose network accessible devices. Network accessible devices comprise devices operated directly by persons, devices that are preprogrammed by software executing thereon, or which are operated by other physical devices. Network accessible devices are distinguished from ordinary telephones communicating over a telephone network. It will be appreciated by those skilled in the art that the type of transactions being discussed herein need not be carried out directly by a human user but may be carried out by a network connected automated software application, or software operated hardware device. Within this application, these transactions are referred to as online transactions involving online payments which distinguish them from an off line transaction where a payer presents a physical credit card or gives a credit card number for payment over the ordinary telephone network. Under appropriate circumstances, the invention may be advantageously employed for both online and off line payments as defined above, where different options and procedures are followed depending on whether the payment is an online or off line payment. Within this application, the terms user, payer and cardholder all refer to the party who is making a payment to a recipient or beneficiary, such as a merchant, to pay for goods or services. It should be understood that within this application a payer, user, or cardholder need not be the actual owner of the account, but may be an agent or other party authorized to use the account, and need not even be a natural person but can be a web connected automated software application or software operated hardware device. The use of such equipment being well known to those skilled in the art.

FIG. 1 generally depicts the current method of making a credit card payment for an e-commerce transaction. A cardholder 100 shops at a merchant's web site 102 over the Internet in process 104. At some time the cardholder has completed the shopping and among other things enters a credit card number on a form on the merchant's web site to arrange payment for the goods purchased in process 106. In addition to the credit card number, the cardholder typically is required to enter other information such as a billing address or expiry date. The merchant's site converts the information into an authorization request in a standard inter-bank protocol and transmits the authorization request to the merchant's Acquiring bank 112 (an Acquiring bank is the bank which processes card payments for a bank and typically credits the proceeds to an account) in process 108. This transmission is typically over a secure private network. The Acquiring bank forwards the request to the cardholder's issuing bank 118 (the issuing bank is the bank with which the card holder has an account which bills the cardholder for the charged purchases) over a secure inter-bank network based on routing information contained in the credit card number which identifies the issuing bank in process 114. The issuing bank 118 returns an authorization code or a denial to the Acquiring bank in process 116 which returns it to the merchant in process 110. For an approved payment, the issuing bank ultimately clears the account with a credit to the merchant's account with the Acquiring bank, and bills the cardholder.

Figure 2:
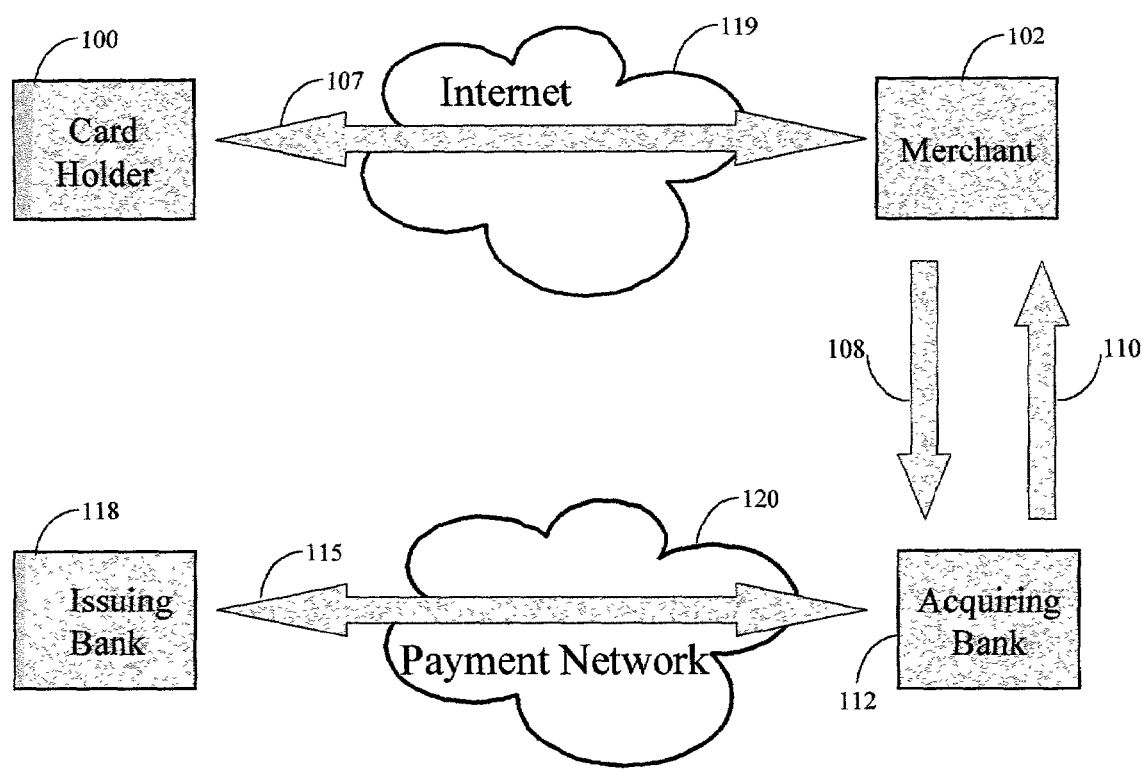
FIG. 2 is a cartoon of the transaction of FIG. 1 showing the different networks involved.

FIG. 2 shows the same process showing that the interactions 107 between the cardholder 100 and the merchant 102 takes place over the Internet 119, while the interactions 115 between the Acquiring bank 112 and the issuing bank 118 takes place on an inter-bank payment network 120.

There are a number of deficiencies with this existing ubiquitous payment protocol.

Including:
1. The cardholder must provide a real credit card number and billing address to the merchant. This information can be misused or stolen compromising the cardholders privacy. For instance, there is an opportunity for third party theft of the cardholder's confidential information. More subtly, the cardholder's privacy is severely compromised by virtue of the protocol requiring the cardholder's card number and true identity to be handed over to the merchant.
  2. The Acquiring bank, issuing bank and optional 3rd parties such as payment Processors, fraud services, etc. are provided with the cardholders credit card information and a description of where and what the cardholder purchases, whereby the cardholder's privacy is essentially nonexistent.
  3. Typically, no authentication of the cardholder is performed. If the cardholder's credit card information is obtained by a hacker, as by raiding a merchant's site, the hacker can easily pose as the cardholder.

Embodiments of the instant invention solve these problems of security and privacy as well as otherwise improving the online payment experience of a cardholder (payer). A preferred embodiment of the invention inserts a trusted third party service, known as a persistent dynamic payment service (PDPS), into the payment process. While particular embodiments may be described as involving Internet transactions, they could just as well involve a different public or private network where online transactions comprising online payments are made. It should also be noted that when the PDPS is referred to as a trusted third party in this application, it refers to the fact that it is a third party with respect to the payer and the merchant. It will be seen that the PDPS interacts with the payer without the need for any special interaction between the merchant and the PDPS, beyond the ordinary existing action of submitting a payment authorization request to its Acquiring bank. In fact to preserve the privacy of the payer, it is preferred that the functioning of the PDPS be unknown to the merchant. The PDPS bridges the network, on which the e-commerce transaction takes place, with the secure inter-bank payment system. The PDPS operates in partnership with an entity, such as a bank, which is part of an inter-bank payment network. In this application, the entity will be referred to as the Payment Processor. The PDPS may physically be fully integrated with the Payment Processor or they may be separate entities communicating with each other over secure lines or a secure network or intermediate configurations. The PDPS presents a world wide web or similar portal accessible to the payer. The PDPS allows the payer to establish a persistent channel to the PDPS through the web portal. The web portal may often be on the same network as the payer-merchant interaction, but alternatively they may be on different networks. For instance, the payer-merchant interaction may be on the Public Internet while the persistent channel is on a VPN. The persistent channel is a two way electronic communication with the PDPS, which is different from the channel used to communicate with the merchant, or in the case of multiple transactions, merchants, and which once opened is available for communication and verification until terminated. It can be implemented in data, voice, and video networks. Data networks comprise computer systems, personal digital assistants, G3 phones, and the like. Voice networks comprise regular wire phones and wireless phones. Video comprises real time video interaction. A persistent channel can be established by a payer or by the PDPS portal. In the case of a data channel, the connection is usually initiated by the payer and maintained in a connection table in the PDPS. However, the PDPS portal could initiate a data channel with a payer having a static (or known) IP address with known port number on the payer side. The two directions of communication over the persistent channel also need not be a single physical channel. For example, by a prearranged preference, a payer could initiate a channel from a computer system, with replies set to come to a PDA. A persistent channel remains open until closed. A channel may be closed by an action taken over the persistent channel or by a time out after a predetermined time.

One important feature of a persistent channel is that it is capable of remaining open across a number of transactions. Thus in online shopping a user may open the persistent channel and allow it to remain open during a plurality of transactions involving a plurality of merchants.

Figure 3:
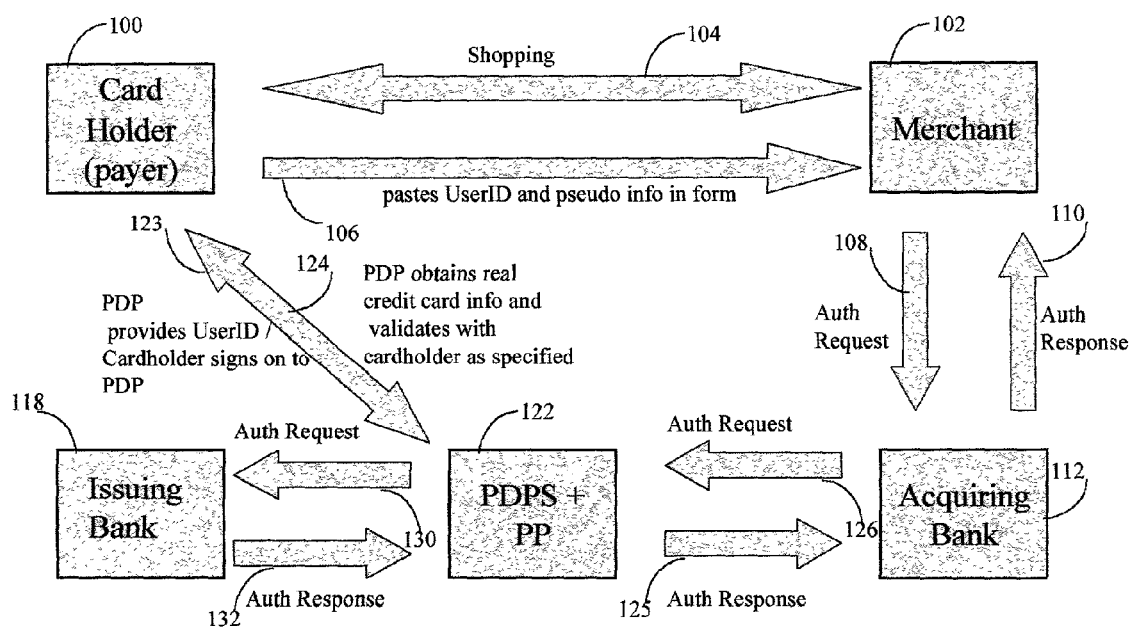
FIG. 3 is a process flow diagram showing processing of a transaction according to one embodiment of the invention employing a Persistent Dynamic Payment Service.

One preferred embodiment of the invention serves a payer using a personal computer to access a network such as the Internet through a browser is illustrated in FIG. 3. The payer is assigned a proxy account number in an enrollment process. The enrollment may take place online or off line. The PDPS associates the proxy account number with a valid account number of the payer, as well as with other information such as the payer's billing address, expiration date and preferences, in a database. The proxy account number has the standard syntax of a credit card number and has routing information which directs payment requests involving it to be directed to the Payment Processor partner of the PDPS. When a payer utilizing the PDPS goes shopping on the Internet, the proxy account number is entered when a credit card number is requested. Before entering a payment, the payer opens a persistent channel to the PDPS by contacting the PDPS portal on the Internet. The payer is authenticated to the PDPS by an appropriate protocol such as entering a user id and password or utilizing a PKI technology or simply by having access to the device that initiates the channel. Once the payer is authenticated, the PDPS portal activates a PDPS Agent application which is embedded in the portal which establishes the persistent channel and registers the payer's presence. The Agent is presented as a frame on the payer's browser, and preferably provides the proxy account number and other payer information from the PDPS database onto the merchant's online form. The payer's information such as the billing address may be either the actual information or a persona according to the payer's preferences. In an alternative embodiment, the PDPS can be configured to have the PDP Agent functions provided by existing e-Wallet programs, providing that they are compliant with the PDPS service contract. In an alternative embodiment, the payer does not need to open the persistent channel directly by contacting the PDP portal. The channel can be opened by the payers' indirect action such as by initiating an e-Wallet, by starting up the payer's computer, etc. In this case, the PDP Agent automatically initiates the channel on behalf of the payer when instructed to by preset preferences. For example, the agent can recognize the payer is making a purchase at a merchant web site and can initiate the channel.

Since the information provided is syntactically identical to those of a standard credit card, the merchant processes it normally. The credit transaction information goes to the merchant's Acquiring bank. Based on the routing information embedded in the proxy account number, the Acquiring bank contacts what is thought as the issuing bank, but which is actually the Payment Processor partner of the PDPS who forwards the payment request to the PDPS. The PDPS speaks the same inter-bank protocol as the banks, and acts as the proxy intermediary to payer's issuing bank. PDPS authorizes the transaction request based on the authorization preferences stored in the user's PDP database. In the simplest case the authorization is approved if the payer's persistent channel is available, that is in this case, the proxy card is active for payments when the persistent channel is available. For a higher level of security, the payer preferences may be set to require personal approval of the payment. In this case, the PDPS would contact the payer real time over the persistent channel to authorize the payment.

Since the persistent channel can remain open for multiple transactions among multiple merchants a user could complete a plurality of purchases at multiple sites with the PDP Portal processing each purchase as it occurs or accumulating the purchases for approval in a batch by the user.

If the payment qualifies for approval, PDPS places the actual credit card and payment information on the payment request and returns it to the Payment Processor. The Payment Processor sends the request to the payer's issuing bank on the credit card to authorize the transaction. The issuing bank returns the approval response to Payment Processor. The Payment Processor forwards it the PDPS, which places it in proper form, and returns it to Payment Processor. The Payment Processor forwards it to the merchant's Acquiring bank. The nature of the changes made by the PDPS include changing the account number back to the proxy account number. Under current banking practice the Acquiring bank expects to see the same account number as was originally on the record and will trigger an error if the number has changed.

If multiple transactions are accumulated, the PDPS and Payment Processor would settle with all the merchants upon completion of the user's shopping.

If the transaction does not qualify for approval by the PDPS, it cancels the transaction on payer's behalf and modifies the request to show an unauthorized code. The request is returned to the Payment Processor and to merchant's Acquiring bank.

It will be readily appreciated that the improved process solves the major problems of online payment transactions. Since it is not necessary to enter a valid account number and billing address the payer's privacy is protected. Neither the merchant nor the merchant's Acquiring banks needs to have access to the account number or identity of the payer in order to complete a payment transaction. The proxy account number which is transmitted over the Internet is not useful in itself, since it can only be used under the conditions set by the payer, either the persistent channel is available or real time approval over the persistent channel.

A unique feature of the improved process is that the PDPS allows authentication of the user and authorization of the payment in an integrated process conducted by a third party over a persistent channel.

The basic process described above leads to several optional embodiments which add further value, as described below:

1. Either during the enrollment process or at any later time when the payer has access to the PDPS portal the payer may set preferences as to how payments should be authenticated. For instance,
    a) automatically authorizing payments under a specified limit,
    b) automatically authorizing payments for a specified time period or to a specified merchant,
    c) automatically refusing payments above a specified level or to a specified merchant, or
    d) requiring personal approval under specified circumstances.

2. A payer may submit two or more actual accounts which are all associated with the payer's proxy account number as potential sources of funds. When a request for payment reaches the PDPS, the payer is contacted by the PDPS portal through the PDPS Agent over the persistent channel and offered a choice of accounts from which to make the payment. The payer is able to choose one of the actual accounts or to split the transaction among two or more actual accounts. The PDPS converts the original payment request into one or more new payment requests from actual accounts as appropriate and forwards these to the Payment Processor. The Payment Processor forwards the requests to the issuing bank or banks.

It is important to note that splitting a transaction among a plurality of accounts introduces an additional complexity into the process as described above for the preferred embodiment with reference to FIG. 3. As previously described, when the issuing bank for the payer's account approved or disapproved the transaction, this information was forwarded back to the Payment Processor, then the Payment Processor forwards the response to the PDPS which puts it in proper form and returns it to the Payment Processor which forwards it to the merchant's Acquiring bank for transmittal to the merchant. When split transactions are employed the situation is more complex, since the transaction can fail if any of the splits are not approved, necessitating reversal of all of the splits. For this reason, when the Payment Processor sends the responses from each the issuing bank associated with each leg of a split transaction to the PDPS prior to forwarding the approval or disapproval to the merchant's Acquiring bank. The PDPS in turn reassembles the splits back into the original composite transaction, and prepares a proper response for the Payment Processor to forward to the merchant's Acquiring bank confirming the entire consolidated transaction referencing the original proxy account number entered by the payer.

The ability to split a payment among accounts is a very desirable feature which enables payers to treat their credit and asset accounts as a single source of funds for making payments. Also, a single purchase may be separated into accounting categories, such as a purchase being divided into a business component and a personal component.

3. The actual accounts which are associated with a proxy account number need not be credit card accounts. While most online merchants only accept credit cards, most banks are capable of processing multiple account types such as credit cards, debit cards, and bank accounts such as checking accounts. The PDPS enables a payer to list any combination of these accounts on the list of accounts which are associated with a proxy account number, and to choose one or more of these accounts for making a payment. A payer can utilize any payment account to debit, while crediting the merchant using the credit card network. For example, if the payer had selected a debit account for this purchase, PDPS would provide the Payment Processor with the correct debit card number, who would debit the customers account and provide the Acquiring bank with an appropriately formatted authorization response message.

Processing a variety of account types is possible because the payer is still accessible online or through out of band communication channels, allowing the debiting bank to request additional information necessary to process the transaction, without requiring the merchant or Acquiring bank to be involved. For example, the Debit bank may request a PIN number to be entered, or the cardholder's mother's maiden name or other authenticating information. PDP would send a message directly to the payer or send the message through a participating e-wallet to prompt the cardholder to enter the necessary information. For large value purchases, PDPS can contact the consumer using an out of band verification such as a telephone call. Debit cards are recognized as being much more risky than conventional credit cards for use on the Internet. This is because current law and industry practice provides less protection to a consumer whose card has been used fraudulently. The PDPS eliminates the risk that the debit card number is discovered by unauthorized parties since the number is centrally secured and not passed over the Internet.

4. The PDPS provides increased security and dynamic control over payment transactions for the consumer. The payer can control the payment either before the transaction with the merchant has been initiated or in the midst of the transaction, after initiation of purchase with the merchant but before the payment authorization process is completed by the issuing bank. Before the transaction, the payer can enter preferences, and in the course of a transaction the payer is prompted for input over the persistent channel or by the PDPS processing pre-established rules. These actions can be taken over the PDPS Portal, or a persistent channel in Telephone, ATM, Interactive television, PDA, mobile interface, or the like.

One particularly interesting option is to allow the cardholder to otherwise modify the transaction record in addition to approval or disapproval. For instance, an payment request typically contains a field with a transaction description of the merchant and/or merchandise purchased. This information is accessible to the issuing bank and may be used or even sold. To preserve privacy, the cardholder may modify this field either by preference or when prompted for approval of the transaction. For example a cardholder may choose to have all transactions identified as "merchandise".

5. Another optional feature of a PDPS is to maintain a list of valid or questionable merchant's by URL/IP address in the PDPS database. The list can be assembled based on the PDPS's experience with problems reported by users, amount of chargebacks, as well as fraud reports from issuing banks and associations such as Visa™ and Mastercard™. When a payer visits a merchant with a good record or a questionable record or an unknown record an appropriate notice is sent to the payer over the persistent channel An advantage of this option is that the feedback is provided from the PDPS without the merchant having any knowledge of the feedback provided. This optional feature will be valuable in prevention of so called "merchant fraud" where a purported merchant accepts credit card payments without intending to fulfill the transaction by shipping goods or performing an agreed upon service. There are many case where a web site is just put up to collect credit card and confidential information from users. A consumer has little defense against such an attack. However, the PDPS will identify such schemes and help protect its users against them. A PDPS can detect discrepancies, between the URL, the site's content and the "doing business as" name that would be passed to the Payment Processor in an authorization request transaction. For example, a merchant may put up a site with a similar URL to that of a well known site, however in such a case, the "doing business as" name on the credit transaction will not correspond to the URL or site content. When using PDPS to confirm a transaction, a user could spot this fraud by PDPS highlighting the discrepancies. A PDPS can also readily spot a common type of online fraud wherein a phony merchant site merely collects credit card information for future use, without processing a credit card transaction.

6. Embodiments of the invention have thus far been described as using proxy account numbers which are assigned to users and are mapped against users' valid account numbers and other credentials in the PDP database. In order to be able use the existing infrastructure for processing account transactions, it is preferable that an improvement enter a syntactically correct account number with routing information which will cause a transaction involving the number to be forwarded to the Payment Processor. However, in online transactions according to the instant invention, a payer authenticates to the PDPS over the persistent channel before the completion of a transaction with a merchant, and the transaction is validated using the persistent channel after the transaction is completed with the merchant. Therefore, as long as the routing information on the proxy account number identifies the Payment Processor, the remainder of the account number entered on the merchant's form need not be the information which uniquely identifies the payer. The identifying information can be anywhere on the information which the payer enters. As an example, identifying information could be entered on the address field. Further, in some embodiments of the invention the PDP gains contemporaneous access to the entry of data onto the merchant's input form via the persistent channel. In those embodiments, the PDPS may link the payer's identity to the contents of a particular order at the time the order is created on the merchant's site, so that the transaction will be recognized and the payer known to the PDPS when the authorization request comes through for approval. In this case the PDP database preferably maps a user identifier used for authentication against the user's valid account numbers and other credentials.

Timing

It will be appreciated by those skilled in the art that approval of an online credit card transaction normally proceeds extremely rapidly, often within a few seconds. After failure to receive a response within a predetermined time Acquiring banks will issue a "time out" error. Occasionally, the extra processing introduced by the PDPS will result in the Acquiring bank timing out before the PDPS can is able to reply to the Acquiring bank. This situation will most likely occur when real time interaction with the payer is used for approval, choice of accounts, or modification of the purchase record. Automatic approval or simple verification of the availability of the persistent channel will probably be handled within the allotted time.

Those skilled in the art will appreciate that such a time out may be resolved in several ways depending on the approval network protocols. The PDPS provides payment request timeout and retry functions. In some cases it will be possible for the PDPS to instruct the Payment Processor to request re-sending of the original transaction information from the acquiring bank. A second alternative opportunity involves the fact that an Acquiring bank may retry a timed out transaction itself To take advantage of this opportunity the PDPS completes the approval transaction with the payer and records it in the PDP database. When a retry comes through, the PDPS recognizes that the transaction is already authorized, and returns the authorization to the Acquiring bank. A further alternative for handling a time out is to instruct the payer to complete the approval process, mark the transaction for automatic approval, and then press the "back" arrow on the payer's browser and press the "buy" button a second time. The PDPS processes the second instance of the purchase as "pre-approved" and complete the authorization within the allotted time. An alternative approach is Stand-in Authorization, where in the case of a late reply, PDPS and the payment processor stands-in (authorizes) the transaction to the acquirer. This approach can be followed for example, when the payment processor has prearranged to deduct funds from another cardholders account it can access.

End of Day Clearance and Settlement

Periodically, typically once per day, accounts are settled in a batch process wherein Acquiring banks provide a file containing batches of transactions to a card association which performs operations needed to settle the accounts between Acquiring banks, issuing banks, merchants, and cardholders. Issuing banks receive a daily interchange file that contains all transactions submitted by merchants against their customer accounts for their customers. For transactions involving a proxy account number, the transaction record will need to be processed by the PDPS to replace the proxy account number with the corresponding valid account number. In the case where a Payment Processor is the issuing bank for a transaction, all that is required is to forward the transactions involving proxy account numbers to the PDPS which replaces the proxy account numbers with corresponding valid account numbers and returns them to the Payment Processor which processes them conventionally. In the case where the Payment Processor is processing transactions belonging to another issuing bank the PDPS must exchange the valid account number for the proxy account number and then forward it to the actual issuing bank either directly or indirectly (by returning it to the card association for resending). A relationship will generally be required with either the card association or other issuing banks.

EXAMPLE 1

Referring to FIG. 3, a preferred embodiment of a method according to the invention is illustrated showing processing a payment transaction using a PDPS.

In process 123 a cardholder (payer) 100 completes an enrollment process with the PDPS which in this case is achieved by contacting the PDPS portal through its web address using a browser operating on the payer's computer system. If the cardholder is not a member (does not have credentials to authenticate to the PDPS) the enrollment process is initiated by which the PDPS extracts personal information, account information and preferences from the payer. In alternative options the enrollment process could be carried out off line by mail or telephone. The cardholder is assigned at least one proxy account number. Each proxy account number is associated with at least one actual financial account of some type. The proxy account number looks like a credit card number and is partly composed of random looking numbers, as well as required routing information such as a BIN number prefix (Bank Identification Number) corresponding to the Payment Processor and a suffix consisting of the proper check digit. The proxy account number and the cardholder's information is stored in a PDP database or in a database PDP has access to such as the wallet database or cardholder bank's database. Optionally, one cardholder can be granted more than one proxy account number, for instance one for each of the cardholder's financial accounts, or one for each merchant the cardholder utilizes, or one for each of the user's personas. Other combinations will be apparent to those skilled in the art.

After enrollment is complete a persistent channel is opened from the cardholder to the PDPS Portal. A cardholder who was already enrolled would skip directly to opening the persistent channel by completing the PDPS authentication process rather than the enrollment process described above.

Through the PDPS Portal the cardholder may enter preferences, such as to select a default card, or turn on a credit card for the next five minutes, or to set a dollar limit and merchant identifier for the next payment transaction.

In process 104 the cardholder shops for merchandise as normal at an online shop of a merchant 102.

In process 106, the cardholder initiates a purchase and is presented by the merchant with a web form requiring entry of credit card number, billing address, shipping address, etc. The cardholder enters a proxy account number into the credit card field and a pseudo billing address into the specified fields on the form. The pseudo address may be a valid address but should preferably not be the cardholder's real address to preserve maximum privacy. The completed information is passed on to the merchant.

Since the proxy account number meets the syntactical requirements the merchant thinks it is a valid account and passes it on to the merchant's Acquiring bank for approval in process 108. In process 126, the Acquiring bank sends the transaction to the Payment Processor which the Acquiring bank believes to be the issuing bank based on the routing information contained in the proxy account number.

The Payment Processor obtains the actual card number from PDPS (shown together as block 122) The PDPS attempts to validate the transaction based on the preferences specified by the cardholder during enrollment or as changed at some later date. The preferences can comprise automatic approval or automatic rejection based on preset criteria, checking that the persistent channel is available, prompting for real time approval on the persistent channel, or contacting by telephone at a predetermined number. As previously noted the cardholder may specify changes to other fields such as transaction description either by preference settings or during real time contact through the persistent channel. If approved the PDPS rewrites the authorization request with the valid account number, billing address, and any revised description of merchandise and returns it to the Payment Processor.

In process 130, the Payment Processor, now assuming the role of processing gateway, request authorization from the cardholder's real issuing bank 118 by passing the authorization request on a inter-bank payment network. If the credit is available, the issuing bank approves the transaction. The authorization response is forwarded to the Payment Processor in process 132. The Payment Processor forwards the transaction to the PDPS which places the authorization response in proper form by replacing the actual account number with the proxy account number, since the Acquiring bank is expecting to see this number on the response. The response is then returned to the Payment Processor which forwards it to the Acquiring bank in process 125, and the merchant in process 110.

Figure 4:
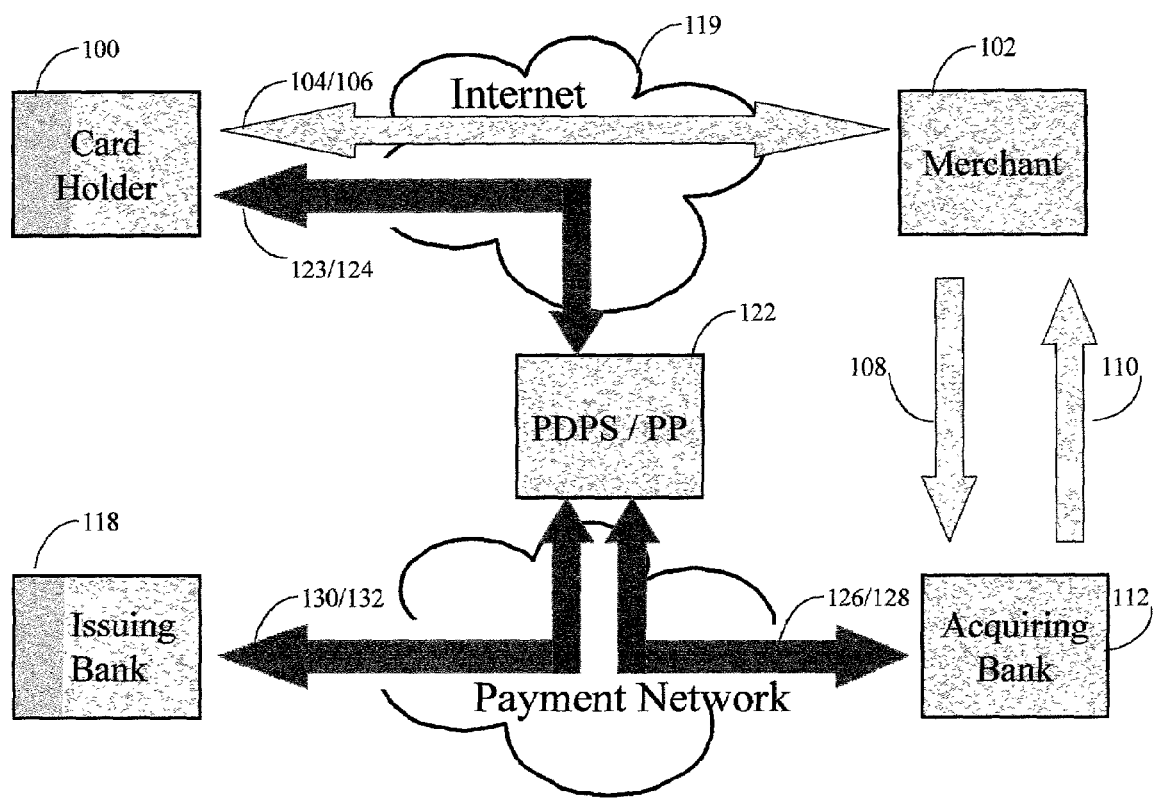
FIG. 4 is a cartoon of the transaction of FIG. 3 showing the different networks involved.

FIG. 4 shows a cartoon of the transaction described above showing that communications 104/106 between the cardholder 100 and the merchant 102, and 123/124 between the cardholder 100 take place on a public network like the Internet while communications 130/132 and 126/128 among banks take place on an inter-bank payment network. Communications 108/110 between merchant 102 and Acquiring bank 112 typically take place over a secure network.

Figure 6:
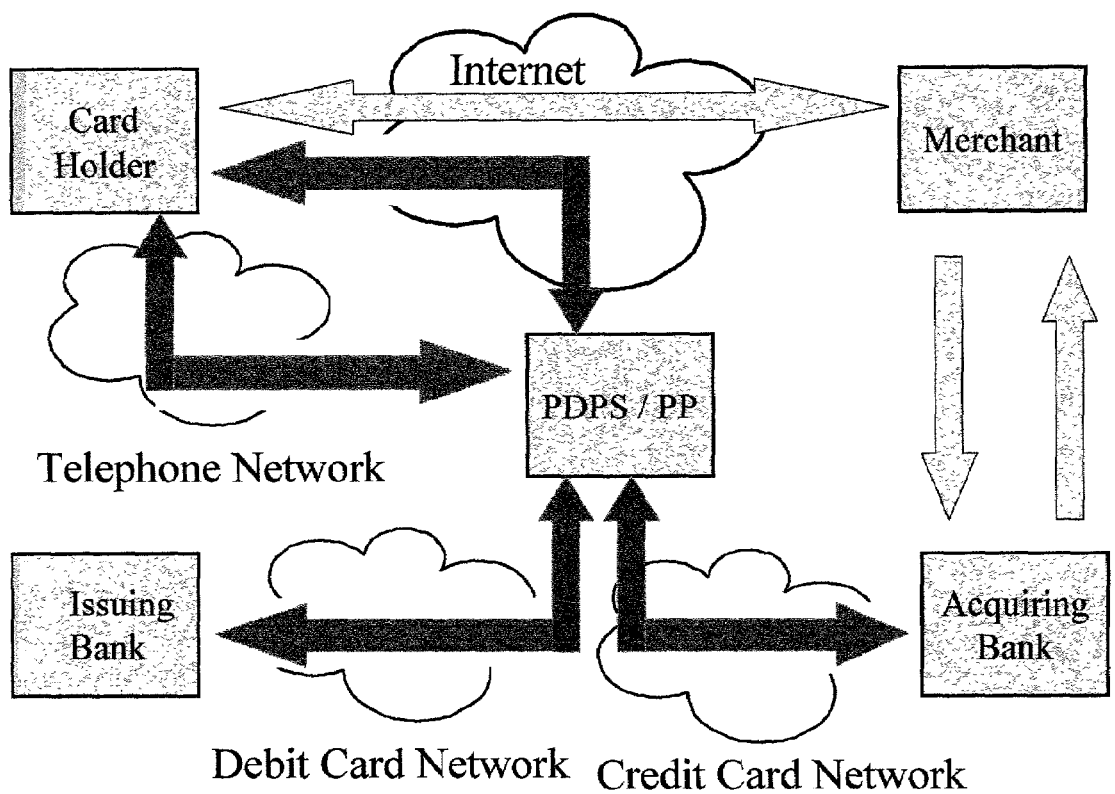
FIG. 6 is a cartoon showing how the PDPS joins several networks.

As previously mentioned the cardholder may associate more than one actual account with a proxy account number in the PDPS, and a payer can utilize any payment account to debit, while the merchant is credited using the credit card network. FIG. 6 shows a PDPS and its associated Payment Processor mediating the debit card approval network and the credit card network. A Payment Processor who can interface with all existing payment networks, can support a universal payment service, one that leverages a single trusted channel for authentication independent of the specific payment network. The trusted channel is uniquely secure since the merchant and financial intermediaries have no knowledge or access to the channel. A cardholder can choose which network to utilize to initiate a purchase and which to use for authorization. For example, a Palm Pilot maybe used to purchase and a PC to authorize. The ability to distribute and control previously fixed processes increases security and control for all parties.

EXAMPLE 2

Figure 5:
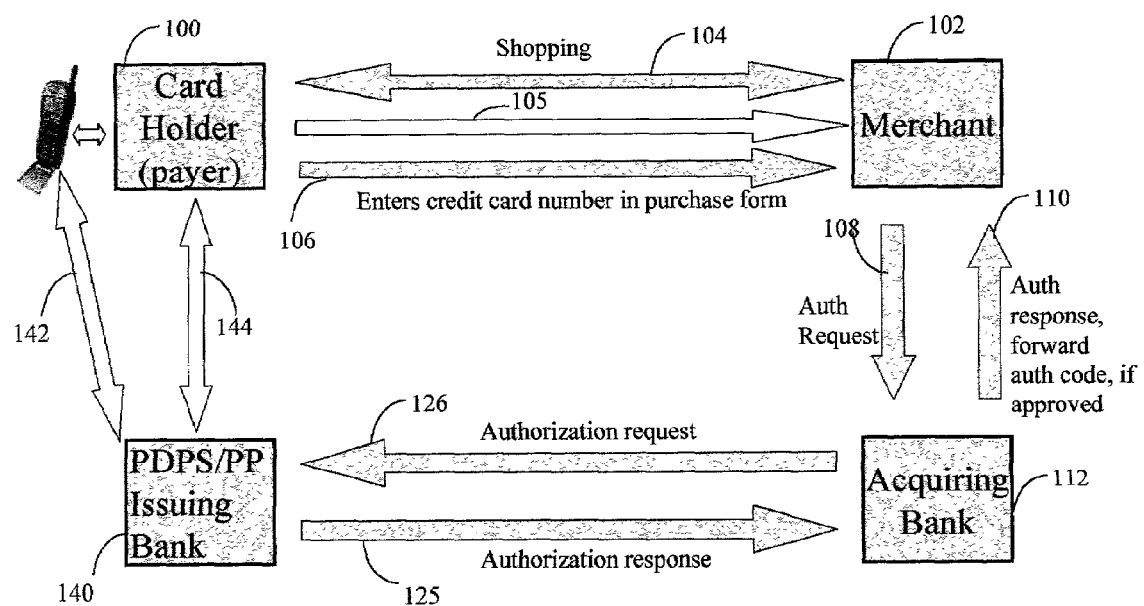
FIG. 5 is a process flow diagram showing an embodiment of the invention where the Payment Processor is the issuing bank.

In another embodiment of the invention, the Payment Processor is also an issuer (issuing bank) for a secure credit card using a PDPS. In this embodiment, several options are possible. In one option, a bank which has an affiliated PDPS, issues secure credit cards to its clients. In this option, the card is capable of use both as a physical card as when the cardholder is physically present at a merchant or alternatively for an online e-commerce transaction. It would not be necessary to use a proxy account number in order to gain the security benefits of the invention. Since the Payment Processor Bank is also the issuer of the credit card the routing information contained in the credit card number will cause a transaction to be routed to the Payment Processor/PDPS in due course when the Acquiring bank presents a transaction for payment. FIG. 5 shows that one step is eliminated in this option because the issuing bank and the payment Processor coincide. This option illustrates that the cardholder preferences may specify different choices of persistent channels for different types of transactions, in this case online e-commerce transactions and in person transactions.

Referring to FIG. 5, a cardholder (payer) 100 is shown online shopping in process 104 and making an online payment in process 106. As in the previous example, prior to entering the payment information the cardholder opens a persistent channel to the PDPS Portal in process 144 by contacting the Portal web address and interacting with the PDP Agent which is embedded in the PDPS Portal. In this embodiment the cardholder may enter the actual card number of a high security credit card for use as a proposed payment. Depending on the privacy interests the cardholder may enter his actual name and billing address or proxy values which may have been prearranged with the PDPS/Issuing bank. A proxy account number may, of course, also have been assigned and could be used, though it is not necessary in this embodiment to make the process work. As in the previous example the merchant forwards the request to the Acquiring bank in process 108, who forwards it in process 126 to the Issuing bank 140 who is also the Payment Processor for the PDPS. In this case, the PDPS verifies the purchase based on the preferences which are established, depending on the nature of the purchase, such as automatic approval or denial, verifying that the persistent channel is available, or prompting the cardholder over the persistent channel. In this embodiment the Issuing Bank/Payment Processor passes the approval result to PDPS and then to the Acquiring Bank in process 125, who sends it to the merchant.

The credit card can also be used with an in person transaction at the merchant's store, as shown in process 105 on FIG. 5. There are a number of options which can implemented in this case. One option is to process all or certain in person payments in the normal payment scheme. Another option is to use a substitute for the persistent channel in order to turn the credit card on and off. One preferred method, involving a substitute for the persistent channel would be to activate the card by telephone before a purchase followed by a similar deactivation call after the transaction has been completed and the card is accepted in the cardholder's presence. The activation and deactivation would preferably involve entry of user identification and password. Another method would be to authenticate a user over the telephone and then keep the telephone line connection open as the persistent channel during the transaction. A telephone persistent channel is shown in process 142 on FIG. 5. Those skilled in the art will recognize many possible ways of establishing a persistent channel which will remain verifiable until the transaction is complete. The type of channel to be used with an in person transaction are established by prearranged preferences or decisions made by the PDPS and/or the issuing bank.

In this embodiment it is possible, optionally, for the issuing bank to also act as a normal Payment Processor for a PDPS, issuing and accepting proxy account numbers issued by the PDPS to customers at large and having routing information which directs these transactions to the bank. In this option the issuing bank handles these PDPS customers just as the Payment Processor in example 1, while treating the customers holding its own card in the manner described in the embodiment of example 2.

EXAMPLE 3

Figure 7:
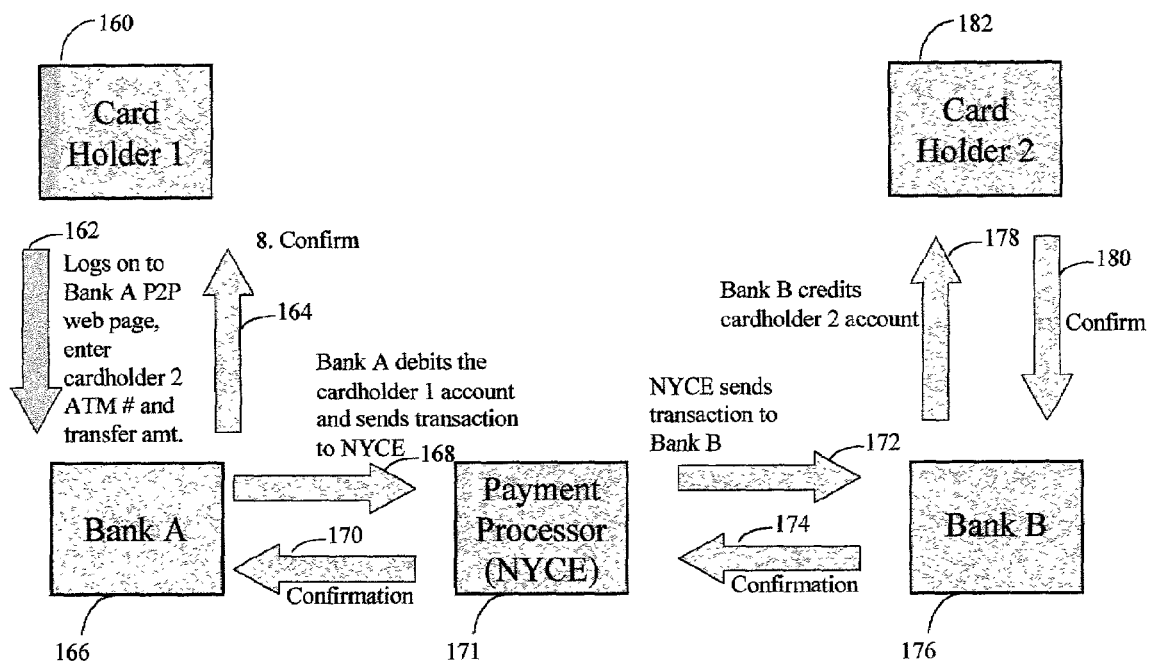
FIG. 7 is a process flow diagram showing an existing peer to peer transfer method.

Another embodiment of the invention involves processing peer to peer payments between two debit card holders. There is an existing web based service offered by banks to their customers whereby an essentially real time transfer of funds is made from a first card holder's account to a second account holder's account. The transfer is effected between the first cardholder's bank and the second cardholder's bank over a shared ATM/debit card payment network such as the NYCE™ network. FIG. 7 shows the existing NYCE peer to peer process as an example. Referring to FIG. 7, Cardholder 1 160 wishes to transfer funds to Cardholder 2 182. The first cardholder has an account in Bank A 166. The second cardholder has an account in Bank B 176. In process 162 Cardholder 1 logs on to the peer to peer web page and enters Cardholder 2's ATM card number and the amount to be transferred. Bank A debits cardholder 1's account and sends the transaction to the Payment Processor 171, in this case NYCE, for the debit card payment network in Process 168. The Process 172 the transaction is forwarded to Bank B 176, which credits Cardholder 2's account in Process 178. A confirmation is immediately returned to Cardholder 1 in Processes 180,176,174, 170, and 164.

The above process should prove to be a very useful way for individuals to achieve real time funds transfer. However its weakness is that Cardholder 1 needs to know Cardholder 2's ATM account number to effectuate the transfer. There is a high level of consumer resistance to, in effect, publishing their ATM account number so that others can make deposits to it. The security of the debit card depends on the card number and the PIN number. When the card number is published the security is compromised.

Figure 8:
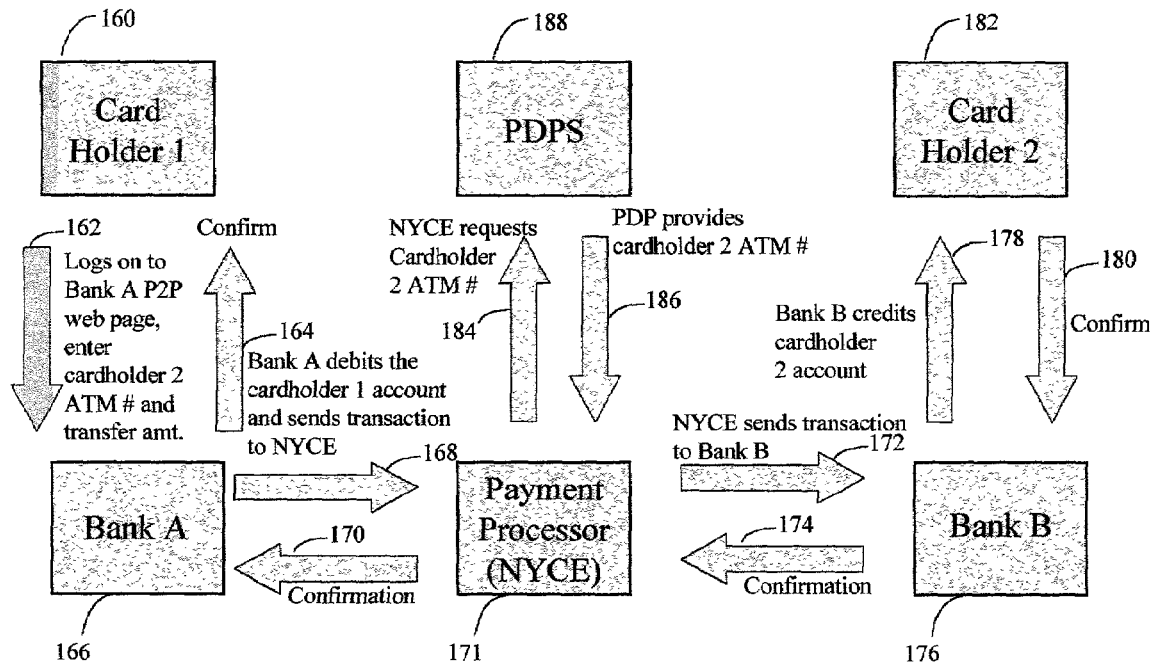
FIG. 8 is a process flow diagram showing the improved peer to peer transfer method according to the invention.

FIG. 8 shows an improved method using a PDPS according to the invention. In this case a cardholder who wishes to participate and securely receive fund transfers, here cardholder 2 registers with the PDPS and obtains a proxy account number in the normal syntax of a debit card number, whose account number routing information identifies it to the Payment Processor as a number associated with the PDPS. The PDPS maintains a database wherein the proxy card number is associated with cardholder 2's actual ATM card number. When a transaction referring to such a number is encountered, the Payment Processor forwards it to the PDPS 188, in Process 184, which in turn returns the valid account number of cardholder 2 in Process 186. The method is otherwise as the original method shown in FIG. 7. The process is improved in that Cardholder 2's ATM number remains private.

In the above example, it is not necessary that an ATM network organization such as NYCE acts as the Payment Processor, in fact any bank on an ATM network could offer the service described. For instance, referring to FIG. 8, if Cardholder 1's Bank, Bank B is the Payment Processor, Cardholder 1 logs onto Bank B's peer to peer transfer portal with her own bank account number and enters Cardholder 2's user-ID and the amount of transfer. Bank B credits Cardholder 2's preferred account and debits Cardholder 1's account at Bank A. Similarly, if Bank A is the Payment Processor, Cardholder 1 signs on to Bank A's peer to peer portal.

It is also possible to use a user-Id which is not in the syntax of a debit account number for a deposit account. For instance, an email address or some other easily remembered alphanumeric could be used. The PDPS would maintain a mapping of the user-ID against the preferred account number.

In addition to the privacy issues described above, the PDPS used in the peer to peer context, allows the receiving party to control settlement for her convenience by establishing pre-set preferences, such as to credit different deposits to different actual accounts depending on size of the deposit, or to notify the user when a deposit over a certain value arrives.

EXAMPLE 4

There are also advantageous uses of the invention where an Acquiring bank for one or more large volume merchant acts as the Payment Processor for a PDPS. In such a case the merchant may authorize the Acquiring bank/PDPS to offer frequent shoppers special personalized service, incentives or terms without direct involvement of the merchants. In this case, the PDPS would track the eligibility of various users when they shop at the involved merchants' sites. When appropriate, the PDPS offers a user the benefit which has been authorized by the merchant and modifies the transaction as appropriate, before it is processed by the issuing bank. This process allows the merchant to offer the incentives without modifying its internal processes at all, and without "spying" on its customers. It allows the customers to take advantage of the incentives without giving up privacy. In addition, transaction time out and the settlement process are easier to manage.

EXAMPLE 5

User Interactions

Figure 15:
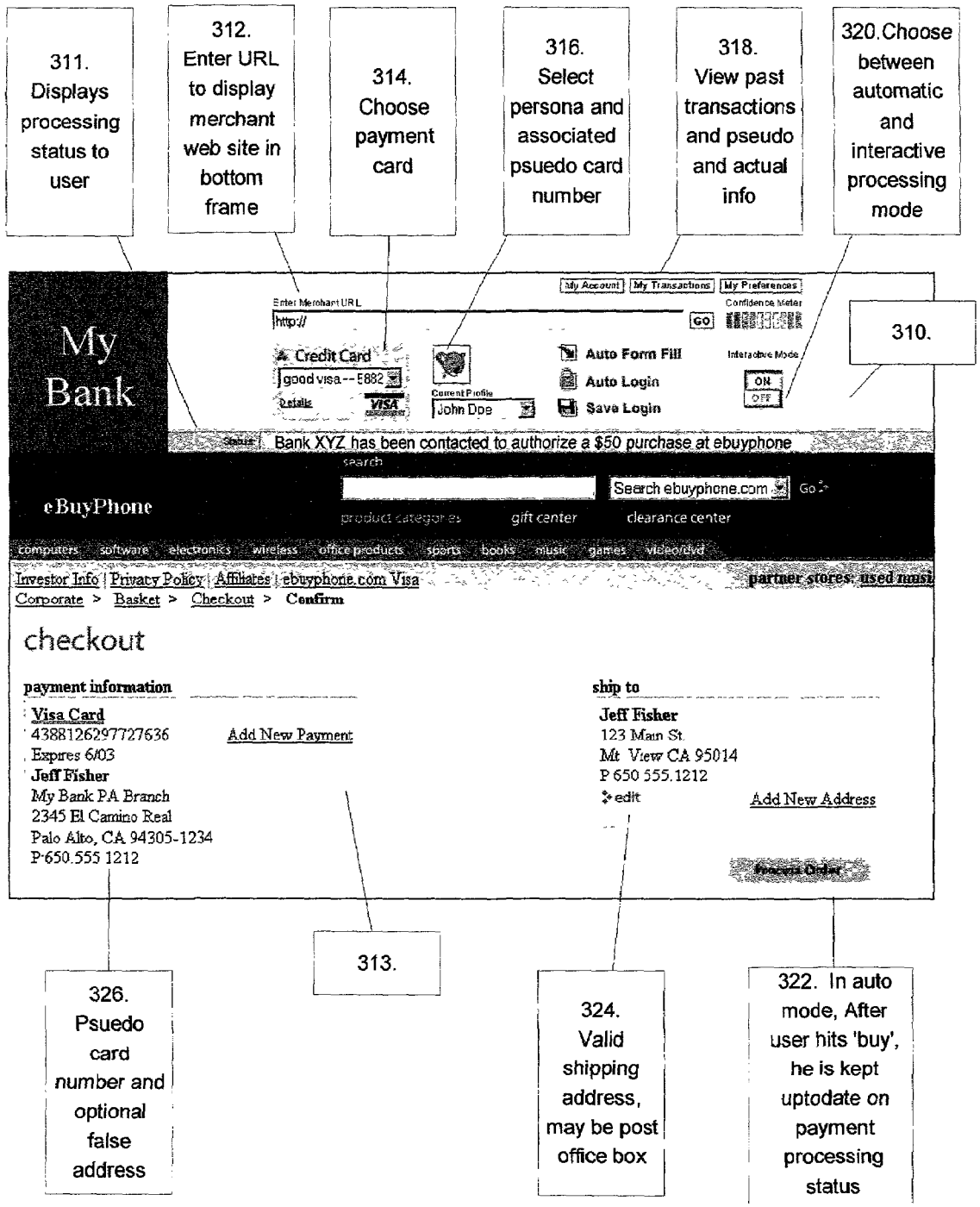
FIG. 15 is a screen shot showing a user interface for a purchase and payment transaction involving the PDPS in the automatic mode.
Figure 17:
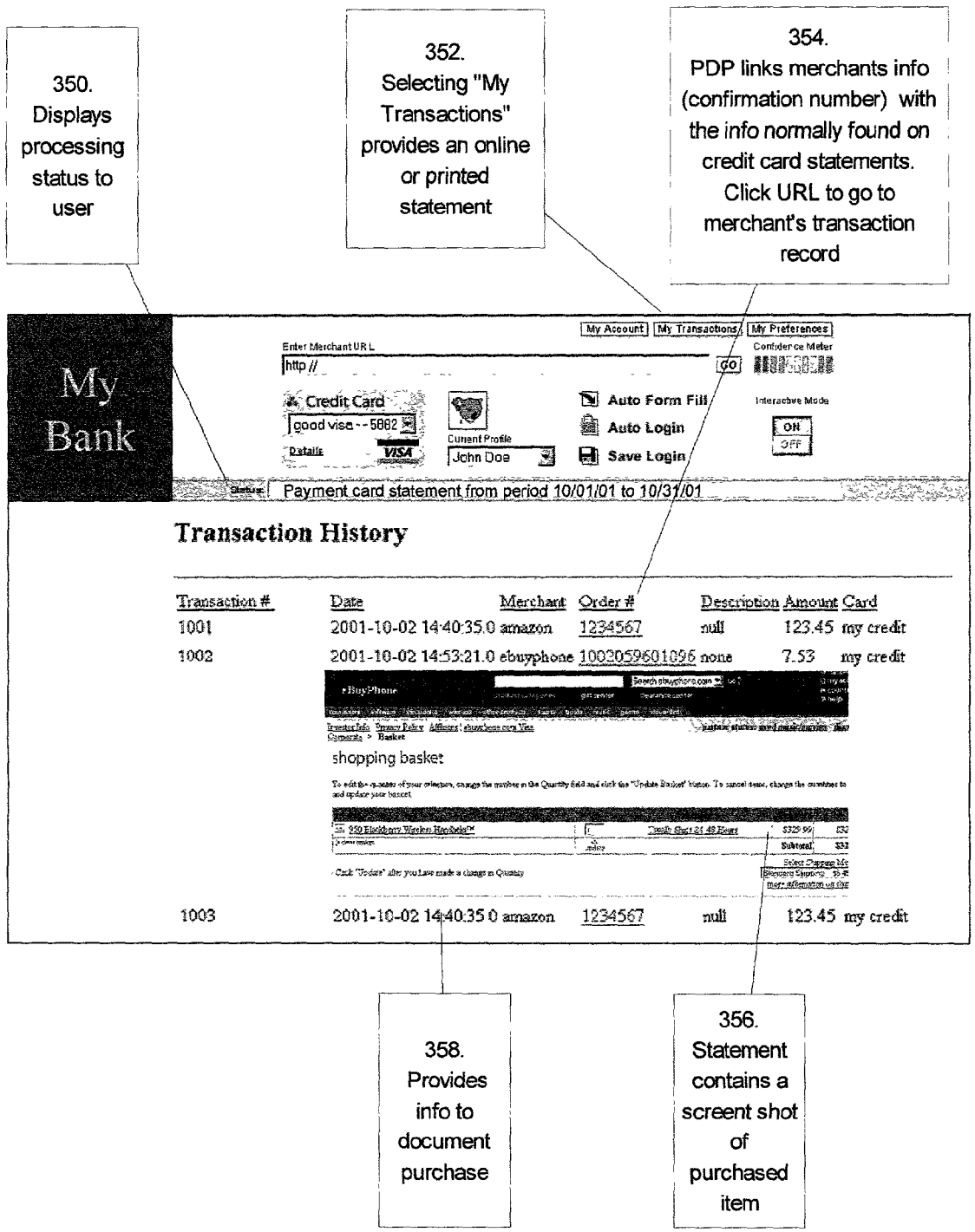
FIG. 17 is a screen shot of the PDP Agent showing transaction history.

FIG. 15 is a screen shot of a preferred user interface illustrating the automatic processing mode. In the automatic processing mode the authenticity of the user is verified by the PDPS verifying that the persistent channel is available at the time the transaction is presented. Referring to FIG. 15, the PDP Agent screen 310 is transmitted to the user as a frame appearing above the merchants checkout page 313. The page has a display box 311 which keeps the user informed of the status of the transaction. The user switches merchants by entering a merchant URL into the selection box 312. Before starting the transaction the user may choose which form of payment to use in card choice box 314. A user may also choose a persona in profile box 316. A persona is a set of choices for name, address, and pseudo (proxy) account number. A user can choose to review past transactions by choosing selection 318. The review transaction page is shown in FIG. 17. A user may also switch from automatic to interactive mode using switch 320. Note that in making an entry onto the merchant check out page 313, the user may enter either a true or pseudo name and address. A valid shipping address which is a post office box may be entered in shipping address block 324, in conjunction with a pseudo billing address in block 322. When a user completes the order on the merchant's site by pushing the "buy" button 326, the PDPS keeps the user up to date on payment status in block 311.

Figure 16:
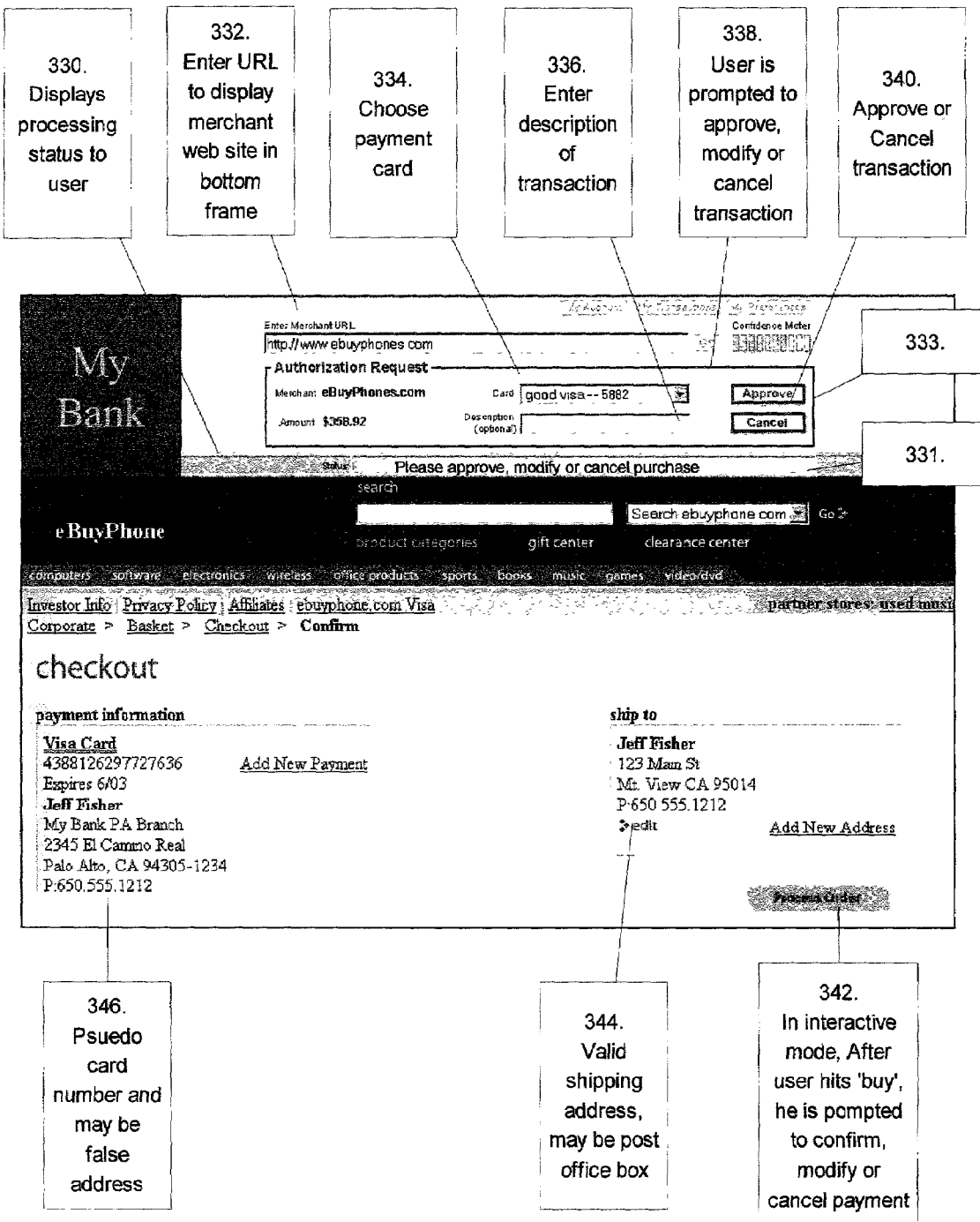
FIG. 16 is a screen shot showing a user interface for a purchase and payment transaction involving the PDPS in the interactive mode.

FIG. 16 is a screen shot of the interactive mode of approval. In the interactive mode a user is prompted to approve, modify, or cancel a proposed transaction, after a user completes the order on the merchant's site by pushing the "buy" button 346. Referring to FIG. 16, the PDP Agent screen 310 is transmitted to the user as a frame appearing above the merchants checkout page 313. The page has a display box 330 which keeps the user informed of the status of the transaction, in this case informing the user that the transaction is awaiting user's approval. In the interactive mode, an Authorization Request block 333 is transmitted for the user to approve, modify or cancel a transaction. Within this box the user may choose a payment account in block 334, may add an optional description, and may approve or cancel the transaction in block 340. In this mode, the buttons for 'my preferences', 'my account' and my 'transactions' are disabled. FIG. 17 is a preferred page for user interaction in reviewing prior transactions. FIG. 17 is invoked by selecting the "My Transactions" button 352. Like the other pages, there is a status line 350 which identifies which transactions are being displayed. The PDP links the confirmation number 354 with other details of the various transactions. An innovative option is to include a screen shot 358 of online transactions. For other channels, appropriate information to document the transaction is displayed.

Figure 18:
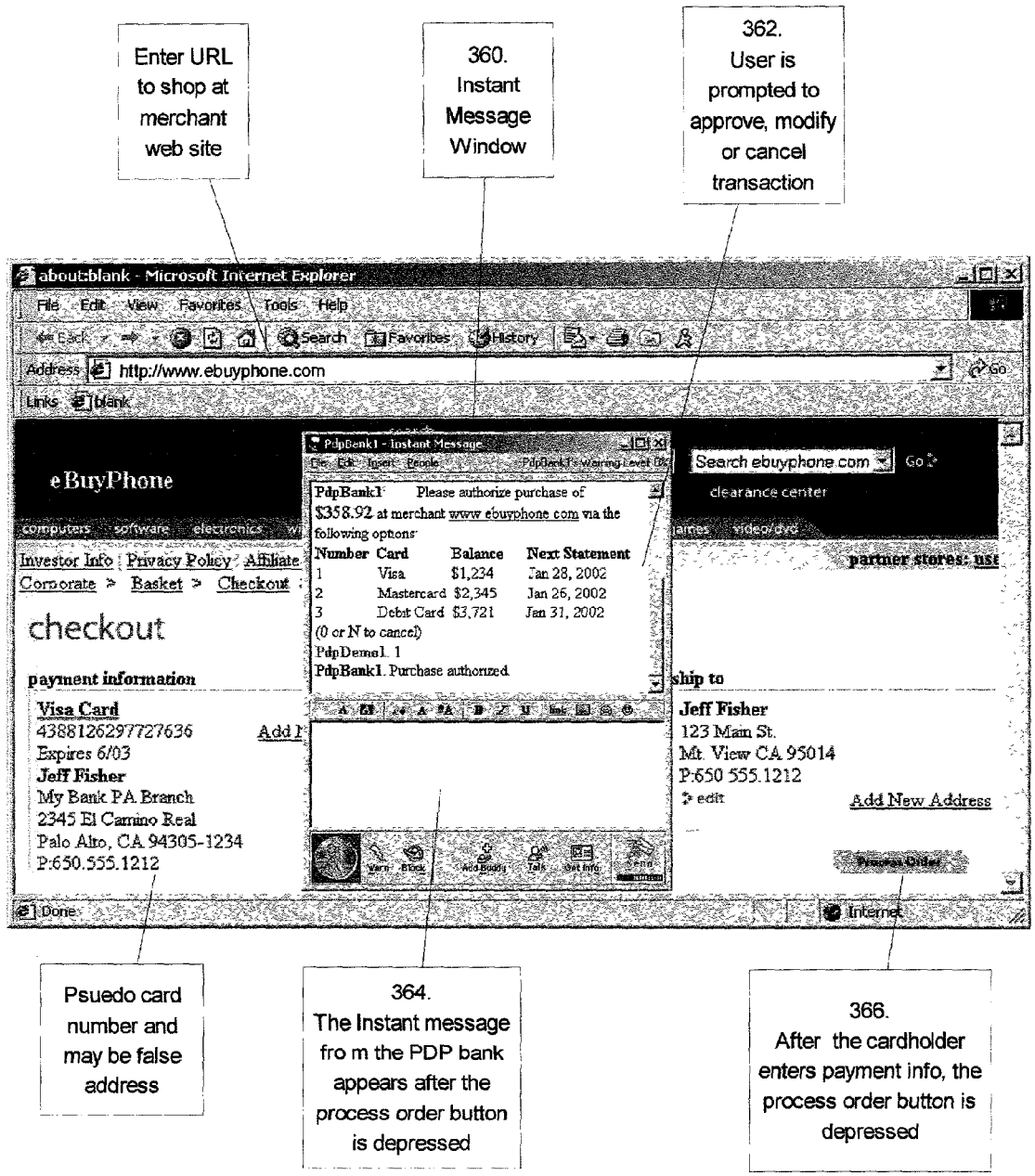
FIG. 18 is a screen shot showing a user interface for purchase and payment transaction involving the PDPS using an Instant Messenger application as the persistent channel.

FIG. 18 is a page illustrating a user interface where an Instant Message application is used for the persistent channel. In FIG. 18 an Instant Message box 360 appears for communication with the PDPS for approval of transactions 362 and communications 364 after the "process order" button 366 is pressed on a merchant's site.

Architecture of the Preferred Embodiments

Overview

Central to the Persistent Dynamic Payment (PDP) invention is the concept of virtual user data with dynamic mapping by a trusted intermediary connected via a direct communication channel, and this mapping can be personalized by users via set preferences or during real-time authorization. In addition, the user always authorizes the mapping through a persistent trusted communication channel directly with the PDPS, as opposed to using the primary communication channel, e.g. Web link with a merchant. Use of the persistent channel is a critical security improvement over the sole use of the merchant link given the basic concern for security in the Internet domain. It is to be noted that intermediaries, including the merchant, along the merchant link have no knowledge or access to the persistent channel. The persistent channel is confidential between the user and his financial institution.

The invention is described as an embodiment in the form of a web service, an online application service referred to as PDPS.

Figure 9:
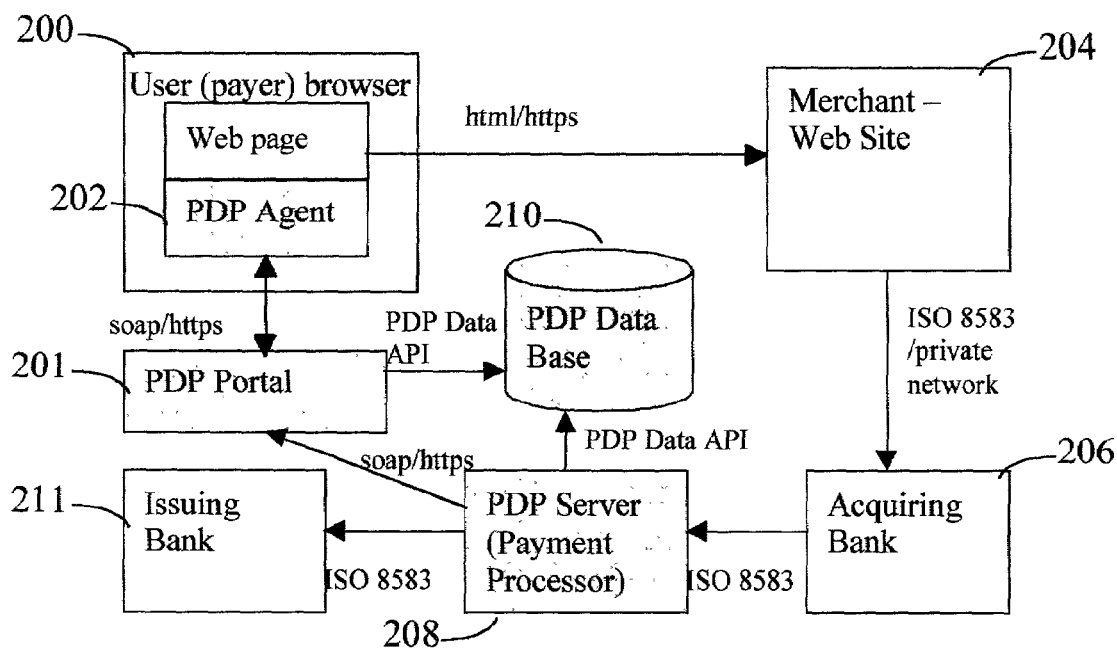
FIG. 9 is a process flow diagram showing the relationship of the PDP components.

FIG. 9 depicts a general flow of how a user (payer) interacts with PDPS and all other essential parties involved, with the arrows indicating the initiating direction in request-response paradigm. Taking out the PDP components (201, 202, 208 and 210) reverts the system back to the payment processing flow typical for credit card transactions.

To start a transaction through PDPS, the user 200 logs in to the PDP Portal 201 first by presenting suitable authentication credentials, e.g. user id/password. After successful login, the PDP Agent 202 makes a persistent connection to the PDPS and registers the user's online presence. When prompted for credit card payment information on the merchant's Web site 204, the user clicks the fill-form button on the PDP Agent frame that provides his proxy-credit card information stored on PDPS. The PDPS Agent fills the merchant's payment forms automatically.

Since the information provided is syntactically identical to those of a standard credit card, the merchant processes it normally. The credit transaction information goes to the merchant's Acquiring bank 206. Based on the routing information embedded in the credit card, the Acquiring bank contacts what is thought as the issuing bank, which is actually PDPS Payment Processor Bank 208 (shown combined with the PDP Server). The PDPS speaks the same inter-bank protocol, acting as the proxy intermediary to user's issuing bank. PDPS authorizes the transaction request based on the authorization information stored in the user's PDP database 210. If the authorization for the transaction is set in user preferences to require approval, the user is contacted via the agent in real time.

If the user agrees, PDPS (through the Payment Processor Bank) contacts the issuing bank 211 on the credit card to authorize the transaction, and returns the approval code to the Acquiring bank. If the user disagrees, PDPS cancels the transaction on user's behalf and return unauthorized code to merchant's Acquiring bank.

Figure 10:
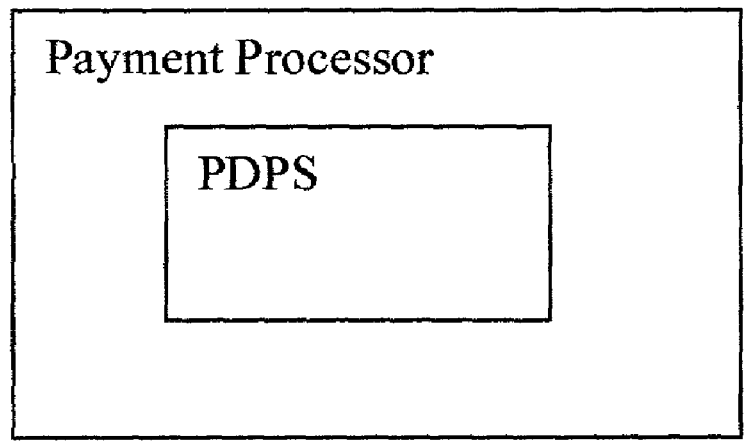
FIG. 10 is a drawing of the two deployment configurations.
Figure 10:
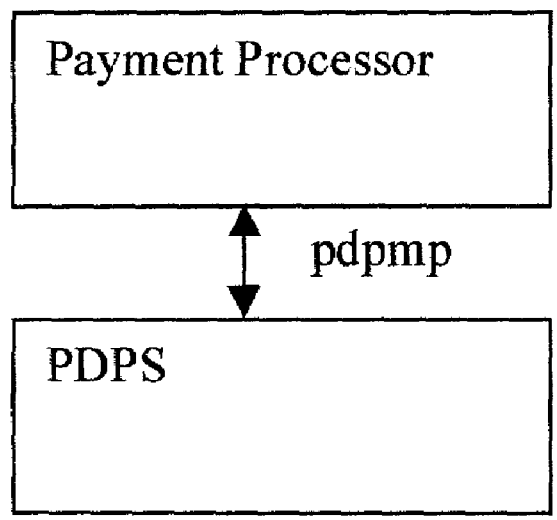

FIG. 10 shows two configurations for a PDPS. In the intranet configuration, PDPS is fully integrated with a bank's payment processing application. In the web service configuration, the payment processing and PDPS reside in different networks but connected through secure link. The web service configuration is the choice for a hosted PDPS solution.

Not showing in FIG. 9 are the firewalls that exist within the system. Both the PDP Database and Server will reside behind company's firewall at certain secure locations as appropriate for their indicated functions. From access standpoint, the security policy needs to allow the PDP Server to connect to PDP Portal, and for the latter to connect to PDP Database. Communication between the system components are protected by SSL (secure Sockets Layer) and PKI (Public Key Infrastructure)—based authentication as appropriate.

The server-side components, namely the Server, PDP Database and Portal, need to satisfy Internet-scale scalability and performance requirements. Since these modules are based on existing software system platforms, these platforms directly address those requirements in corresponding areas of application server, database, and server-side scripting. These platforms, in turn, typically rely on exploiting proven techniques of load balancing and server clustering.

System Components

Figure 14:
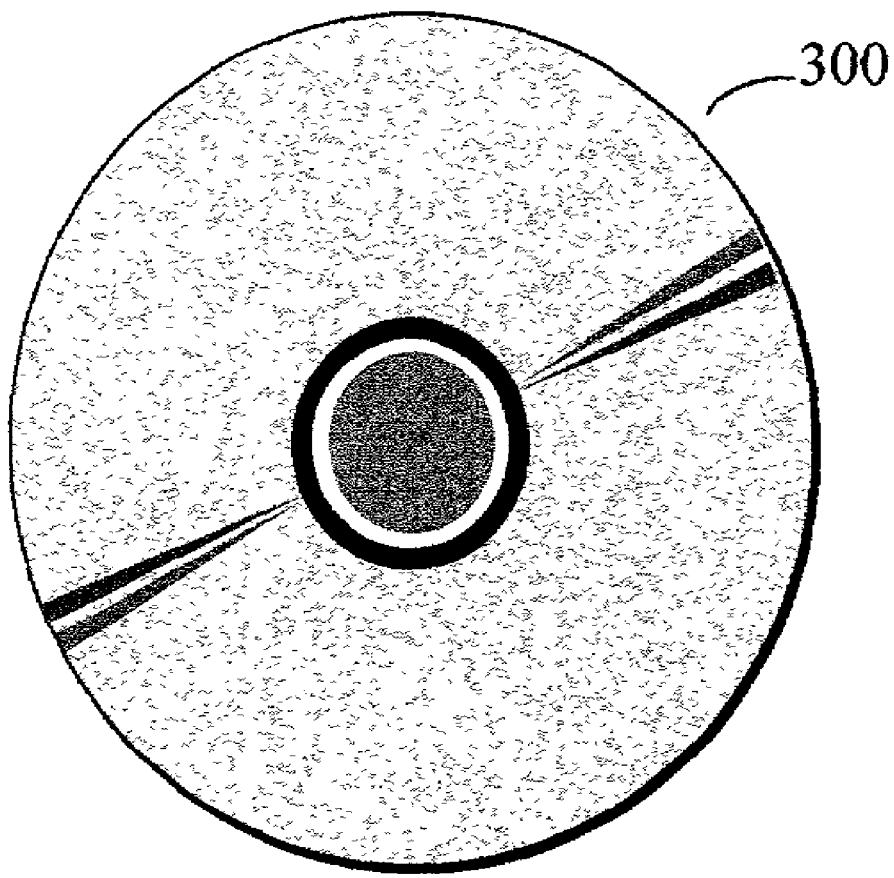
FIG. 14 is a drawing of a CD ROM containing software to carry out a PDP Service in computer readable form.

PDPS is comprised of four principal PDP components: Agent, Server, PDP Database, and Portal. The Agent, Server and Portal components comprise software executing on one or more servers to provide the functions described. The software may be stored and loaded in computer usable form, preferably computer readable form, as an example a CD ROM 300 as shown in FIG. 14.

Agent

In the preferred embodiment, the PDP Agent is embedded into the PDP Portal, such that it can become active once the user signs on with the portal. The Agent provides the functionality, in conjunction with the PDP database, in form-filling automatic user ID/password, and transaction authorization handling. In addition, the Agent is a launch pad for merchant Web sites by providing a URL entry field.

Since the agent is transmitted to the user as part of a Web page, there is no need to manage software version upgrades for the agent outside what's already supported in the standard Web browsers today.

In the preferred embodiment, the user desktop is the Windows operating system from Microsoft.

As a browser plug-in in the form of ActiveX control, the PDP Agent is digitally signed by the PDP Payment Processor's digital certificate. Upon hitting the web page containing the agent control, the browser prompts the user to accept the agent download via a popup dialog. The user can accept or decline with the option of verifying the indicated certificate via its original issuer, e.g. Verisign. After user approval, the agent has full power over the user's desktop, as enabled by the Win32 APIs provided by Windows, which allows the agent to enumerate all open windows and their dependant windows including their current contents. In addition, the agent can intercept all keyboard and mouse events initiated by the user. The agent relies on these API mechanisms to support functionality such as form filling, automatic login, and detecting when the user hits the "Buy" button.

Figure 12:
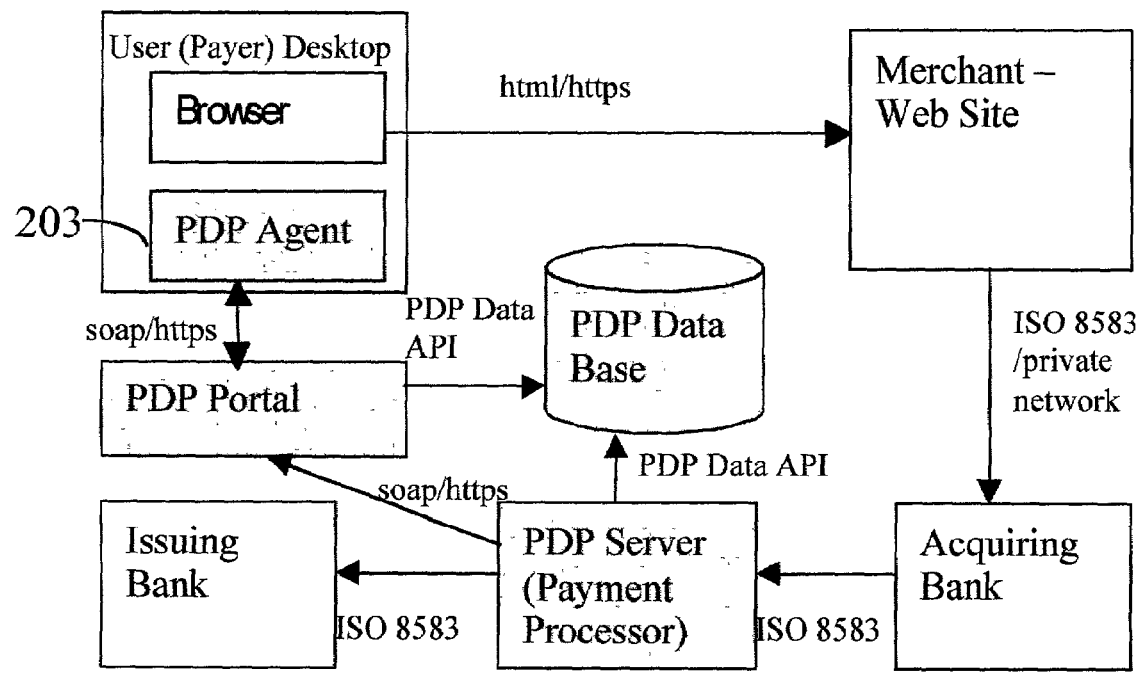
FIG. 12A is a flow diagram showing the relationship of the PDP components for an alternative embodiment of the PDPS.
FIG. 12B is a flow diagram showing the relationship of the PDP components for a second alternative embodiment that includes an Instant Messenger component.
Figure 12:
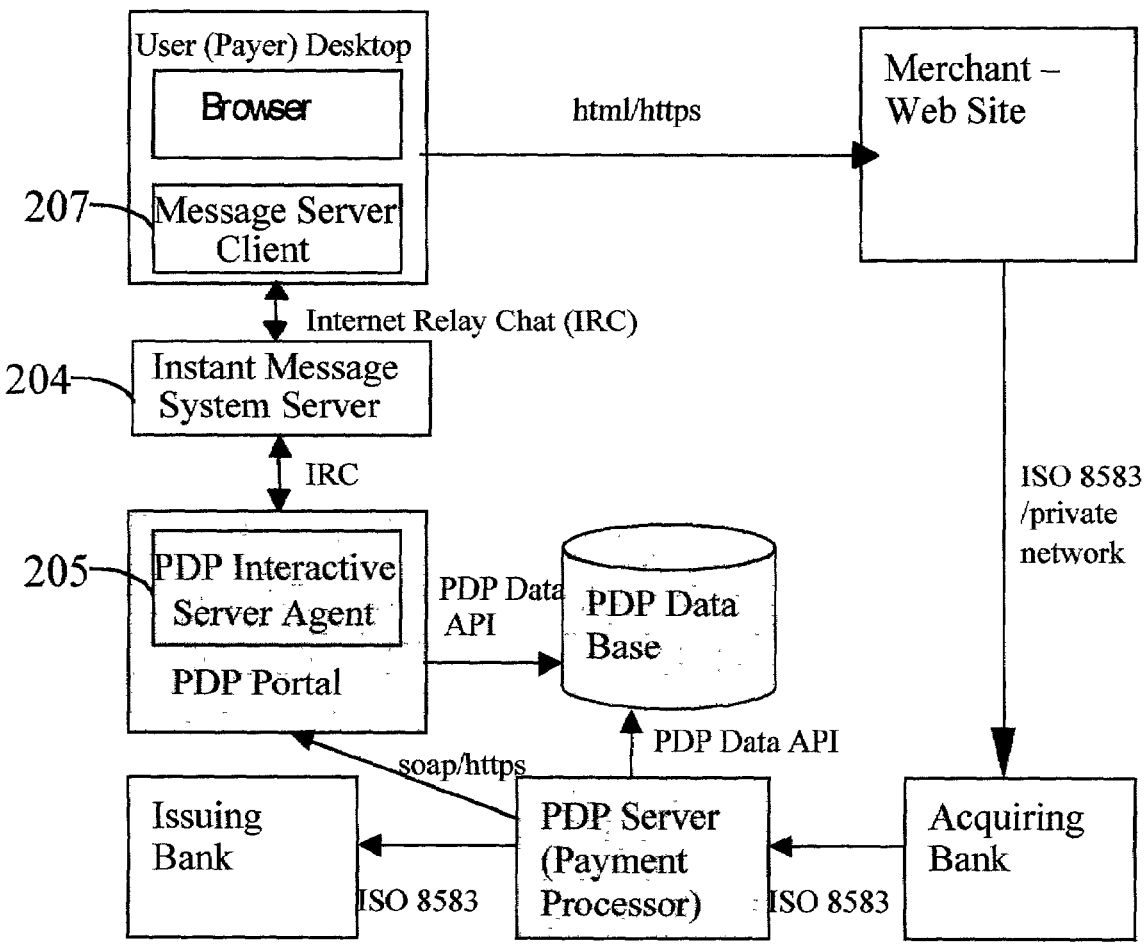

In an alternative embodiment shown in FIG. 12A the PDP Agent 203 is an end-user application that resides on user's desktop or Internet-enabled device. The Agent may be either an independent application program or a browser plug-in. Its main function is to authenticate a registered user to PDPS, obtain pseudo personas, and maintain a live link to the PDP Portal. Over this link PDPS contacts the user for authorizing transaction requests. Since the agent speaks SOAP over TCP, it can be custom developed to work on any device that can be connected to the Internet or secure private network. In this embodiment, the Agent can function as a standalone client-side program, with server-side implementation of an e-wallet. In this default mode, the e-wallet comprises the set of proxy personas as specified by user in the PDP Database. PDPS can also work with other e-wallet client programs, without requiring presence of the Agent. In this case, the e-wallet program must be modified to support the relevant authentication and authorization parts of the protocol used by PDPS, which is discussed below.

Server

The PDP Server is the payment Processor which maps User ID (User ID is used here as a synonym for Proxy Account Number) to actual credit account according to user's stored rule preferences.

It is an application server component residing in the secure network of a typical bank environment. The server has access to users' stored profiles, as well as access to the bank's gateway to process incoming and outgoing credit authorization requests.

The Server connects to the locally registered PDP Portal to look up the currently live communication channel to user's PDP Agent, via messaging as defined by the PDP Messaging Protocol (PDPMP), which is discussed below.

Server Daemon—The server is listening on a pre-set port for messages with ISO 8583 contents. Depending on the local network security topography, the communication channel with the connection initiator can choose to use SSL mode of operation.

Request Handler—The Request Handler is the controller module for PDP Server. It received requests from the banking network, decodes them into programmatic constructs, calls the Rule Interpreter for matching with the actual account, and translates the original request with pseudo data into an equivalent one with real data, and forwards the new request back into the processing network.

Channel Manager—. The channel manager handles the situation where a user may be interacting with PDP through more than one channel at a time. For example, the user signs onto the portal at a PC, but wants the transaction confirmed via telephone. The Channel Manager is a centralized communication router for PDP traffic in the form of voice, fixed line data, and wireless data, etc. As such, the manager accepts and directs the traffic based on reading information from the connections table, performing necessary translation in the process. Through the Channel Manager, any PDP software component can communicate with another across different medium types. For instance, the PDP server can rely on the Channel Manager to interact with user agent via a regular phone; the Channel Manager does the translation of XML protocol to a voice-based protocol in this particular interaction.

Rule Interpreter—The Rule Interpreter is a server component which evaluates existing rules based on data in the transaction request and the PDP data tables.

PDP Database—The PDP Database is the vault for user's data, including e-wallet, personas, preferences, user connections (see User Connection table provided below), and security credentials. The PDP Database can be divided into separate databases, e.g. one for user data and another for connections table. This way allows different security policy to be attached to each database. User data can reside on a centralized server or on a user device such as a PC or networked PDA PDP Portal The PDP Portal provides the management console for both users and PDP system operators (SO). It provides a Web interface, e.g. HTML/XML/Javascript, accessible through standard Web browsers. The users use the Portal to change their PDP user preferences. The system operators use it to effect system or account-wise changes via the system preferences table.

PDP Portal maintains an internal table that keeps track of current user connections and provides access to this table through the PDPMP protocol described below.

Service Daemon—The Portal component runs as a server-side application of a HTTP server with support for Sun Microsystems' enterprise Java environment. All connections to the daemon are preferably SSL-enabled.

Usage—The Portal is accessed by two categories of PDPS users: customer and system operator. The customer authenticates with the portal to modify his user preferences, whereas the system operator modifies the system preferences after necessary authentication. The Portal is also where the system operator performs system monitoring and management, e.g. Portal usage statistics for reporting purposes.

The Portal presents a Web user interface, namely a mix of HTML and Javascript, readily accessible through a standard Web browser. In addition, special WAP (Wireless Access Protocol) compatible versions of the pages is preferably made available so wireless or other Internet-enabled devices can access the Portal. The WAP specification, currently version 2.0, can be found on the Internet web site maintained by the Wireless Access Protocol Forum, Ltd., and is incorporated herein by reference.

PDP Message Protocol (PDPMP)

Figure 11:
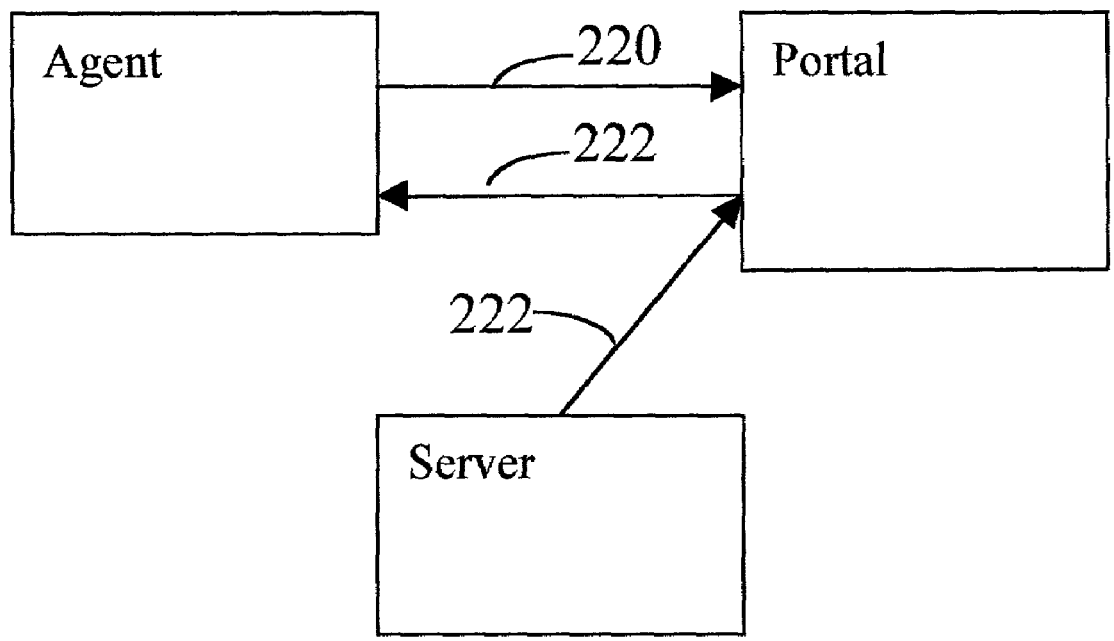
FIG. 11 is a drawing showing Messaging Flow.

PDPMP is a SOAP (Simple Object Access Protocol) based protocol over SSL used by the Portal, Agent, and Server components to communicate with one another. The SOAP Protocol is defined on the Web site of the World Wide Web Consortium and is incorporated herein by reference. FIG. 11 shows a diagram showing the messaging flow in PDPMP. The protocol is bilateral between the Agent and Portal. Path 220 in FIG. 11 is used for identity authentication and establishing a persistent connection; path 222 is used for payment authorization through the connection that has been established in Path 220.

---

Authentication Example - The Agent authenticates with the Portal via the following type of message:
POST /AuthTransaction HTTP/1.1
Host: www.PDPs-portal.com
Content-Type: text/xml; charset="utf-8"
Content-Length: nnnn
SOAPAction: "http://schemas.TrustedPath.com/PDPs/AuthenticateUser/"
<SOAP-ENV:Envelope
    xmlns:SOAP-ENV="http://schemas.xmlsoap.org/soap/envelope/"

```
        SOAP-ENV:encodingStyle="http://schemas.xmlsoap.org/soap/encoding/">
    <SOAP-ENV:Body>
        <m:AuthenticateUser
xmlns:m="http://schemas.TrustedPath.com/PDPs/authorization/">
            <UserID>4A4A7660-CCE6-4629-A5DC-6D868F775DD2</UserID>
            <UserName>PDPS_User_John</UserName>
            <EncryptePDPassword>...</EncrypePDPassword>
        </m:AuthenticateUser>
    </SOAP-ENV:Body>
</SOAP-ENV:Envelope>
```
The following message shows a sample success response:
```
HTTP/1.1 200 OK
Content-Type: text/xml; charset="utf-8"
Content-Length: nnnn
<SOAP-ENV:Envelope
    xmlns:SOAP-ENV="http://schemas.xmlsoap.org/soap/envelope/"
    SOAP-ENV:encodingStyle="http://schemas.xmlsoap.org/soap/encoding/"/>
    <SOAP-ENV:Body>
        <m:AuthentcateUserResponse xmlns:m="
http://schemas.TrustedPath.com/PDPs/authentication ">
            <AuthenticationStatus>OK, User logged in.</AuthenticationStatus>
        </m:AuthenticateUserResponse>
    </SOAP-ENV:Body>
</SOAP-ENV:Envelope>
```
Authorization Example - The Portal relays authorization messages from the Server to the Agent. A sample message is as follows:
```
POST /AuthTransaction HTTP/1.1
Host: www.PDPs-portal.com
Content-Type: text/xml; charset="utf-8"
Content-Length: nnnn
SOAPAction: "http://schemas.TrustedPath.com/PDPs/AuthTransaction/"
<SOAP-ENV:Envelope
    xmlns:SOAP-ENV="http://schemas.xmlsoap.org/soap/envelope/"
    SOAP-ENV:encodingStyle="http://schemas.xmlsoap.org/soap/encoding/">
    <SOAP-ENV:Body>
        <m:AuthTransaction
xmlns:m="http://schemas.TrustedPath.com/PDPs/authorization/">
            <UserID>4A4A7660-CCE6-4629-A5DC-6D868F775DD2</UserID>
            <Amount>2000.00</Amount>
            <MerchantID>...</MerchantID>
            <ItemDescription>...</ItemDescription>
        </m:AuthTransaction>
    </SOAP-ENV:Body>
</SOAP-ENV:Envelope>
```
The following message shows a sample success response:
```
HTTP/1.1 200 OK
Content-Type: text/xml; charset="utf-8"
Content-Length: nnnn
<SOAP-ENV:Envelope
    xmlns:SOAP-ENV="http://schemas.xmlsoap.org/soap/envelope/"
    SOAP-ENV:encodingStyle="http://schemas.xmlsoap.org/soap/encoding/"/>
    <SOAP-ENV:Body>
        <m:AuthTransactionResponse xmlns:m="
http://schemas.TrustedPath.com/PDPs/authorization">
            <AuthCode>OK, User approved.</AuthCode>
        </m:AuthTransactionResponse>
    </SOAP-ENV:Body>
</SOAP-ENV:Envelope>
```
User Connection Look-up Example - The SOAP request message is sent by the Server to the Portal to attempt to connect to the currently live connection to the user's Agent.
```
POST /LookupUser HTTP/1.1
Host: www.PDPs-portal.com
Content-Type: text/xml; charset="utf-8"
Content-Length: nnnn
SOAPAction: "http://schemas.TrustedPath.com/PDPs/userlookup/"
<SOAP-ENV:Envelope
    xmlns:SOAP-ENV="http://schemas.xmlsoap.org/soap/envelope/"
    SOAP-ENV:encodingStyle="http://schemas.xmlsoap.org/soap/encoding/">
    <SOAP-ENV:Body>
        <m:LookupUser xmlns:m="http://schemas.TrustedPath.com/PDPs/userlookup/">
            <UserID>4A4A7660-CCE6-4629-A5DC-6D868F775DD2</UserID>
        </m:LookupUser>
    </SOAP-ENV:Body>
</SOAP-ENV:Envelope>
```
The following message shows a sample success response:
```
HTTP/1.1 200 OK
Content-Type: text/xml; charset="utf-8"
Content-Length: nnnn
<SOAP-ENV:Envelope
```

-continued

```
    xmlns:SOAP-ENV="http://schemas.xmlsoap.org/soap/envelope/"
    SOAP-ENV:encodingStyle="http://schemas.xmlsoap.org/soap/encoding/"/>
      <SOAP-ENV:Body>
        <m:LookupUserResponse xmlns:m="
http://schemas.TrustedPath.com/PDPs/userlookup">
            <ConnectionStaus>OK, PDPMP ready.</ConnectionStatus>
        </m:LookupUserResponse>
    </SOAP-ENV:Body>
</SOAP-ENV:Envelope>
```

With this response, the Server is in position to send an authorization message to the PDP Agent through the very same socket connection where this request/response exchange took place.

ISO 8583 Messaging

ISO 8583 is an electronic banking protocol that defines how payment processing networks interact with banks. It defines both payment data representation as well as processing directives following the request-response paradigm. ANSI X9.2 is the compatible American standard. This protocol can process both credit and debit transactions.

Each ISO 8583 message is internally ordered by message header, message type, bitmap(s), and data fields, as shown in the table below. The same format applies to both request and response messages.

Typically the first six digits of a credit card number identify the card issuer or Bank Identification Number (BIN). The BIN plus 10 other digits forms the cardholder's account number with the issuing bank.

PDP Database

The users' confidential data resides in PDP Database. The store can be a RDBMS or LDAP directory. The PDP Database Interface allows the use of either one or others.

There are five basic data tables: user preferences, system preferences, pseudo persona, real persona, and rules. The rules table specifies the criteria for matching pseudo with actual data table. The User ID (which is the proxy account number) is the primary key to all of the PDP data tables defined in this document.

ISO 8583 message order

| Message Field | Attribute (a = alpha, n = numeric, b = binary) | Comments |
| --- | --- | --- |
| Header | an20 | Alphanumeric characters |
| Type | n4 | Numeric characters |
| Bitmap - primary | b64 | 8 bytes. 0 or 1 value for each bit indicates presence of the associated data field. |
| Bitmap - secondary | b64 | Optional. Presence, following primary bitmap, indicates by presence of 1st bit in primary bitmap. |
| Bitmap - tertiary | B64 | Optional. Presence, following secondary bitmap, indicates by presence of 1st bit in secondary bitmap. |
| Data Fields | Depends on field | Some field attributes are pre-set, e.g. those in primary bitmap, while others are tagged by name and data length. |

User Preferences

| Field | Data Type | Comments |
| --- | --- | --- |
| User Name | Alphanumeric | User's common name |
| User ID | GUID | User's globally unique identifier |
| Authentication Method | Alphanumeric | One of the following: User-password Digital certificate |
| User Password | Alphanumeric | User's current encrypted password |
| User Digital Key Credential | Alphanumeric | Reference to User's public PKI credential. |
| Email | Alphanumeric | User's email address |
| Phone | Digits | User's contact phone number |
| Address | Alphanumeric | User's home address |
| Connection Status | Numeric | Indicates whether user is online 0 YES 1 NO |
| Other | ... | ... |

General Credit Card Information—For a transaction, the following pieces of information are typically requested of cardholder:

Pseudo and Real Personas—The pseudo and real data table share the same data fields, since they will need to match each other, as partially described above and in all applicable rules. In addition, other transaction data fields are shown in the following table.

| Element | Attribute | Comments |
| --- | --- | --- |
| Credit card number | 16 digits | |
| Expiration Date | Month/year | |
| Account Name | Alphanumeric | |
| Billing Address | Alphanumeric (street name, zip code) | Used for billing address verification service (AVS) |
| Cardholder Verification Data (CVD) | numeric | For Visa, it's CVV2 (4 digits printed on back of card) |

Transaction Data

| Field | Rule-Applicable | Attribute | Comments |
|---|---|---|---|
| Card Name | Y | Alphanumeric | Card Instance Name |
| Card Type | Y | Numeric | Credit or debit |
| Transaction Amount | Y | Numeric | Credit limit |
| Billing Address | Y | Alphanumeric | Account's billing address |
| Transaction Date & Time | Y | Alphanumeric | |
| Merchant Type | Y | Numeric | Business category of merchant's business |
| Merchant ID | Y | | Identifies the merchant. |
| Other | ... | ... | ... |

Binary Comparison Rules—The binary comparison rules in the following table apply to the table data.

Binary Comparison Rules

| Operator | Meaning | Comments |
|---|---|---|
| > | Greater than | |
| < | Less than | |
| == | Equals | |
| >= | Greater than or equal to | |
| <= | Less than or equal to | |
| != | Not equal | |
| Other | ... | ... |

Rules—The Rules Table is a set of records with each record contains simple statements formed by these comparisons. Compound statement is formed by applying AND or OR logic operator to a set of simple statements. Parenthesis can be used for grouping and setting order precedence.

For example:
(1) Simple Statement
   Credit Card Number==xxxxxxxxxxxxxxxx
(2) Compound Statement
   (Transaction Amout>100 AND Merchant ID==xxxxxxxxxxxx) OR (Merchant Type==xxxx)

The Rules Table has the following format:

| Rule Instance | Comparison | Action | Matching Real Data |
|---|---|---|---|
| Rule 0 | <statement> | <action> | <RealData> |
| Rule 1 | <statement> | <action> | <ReadlData> |
| ...More... | | | |

<RealData> is the matching data from the real account for the transaction.

Actions are name-value pairs stored in the action table, which follows.

Action Name Value Table

| Action Name | Action Value | Comments |
|---|---|---|
| Authorize | | Ask user for authorization for transaction. |
| | Auto | No need for user approval. Transaction is processed automatically. |
| | Agent | The transaction requires user approval via the online agent channel |
| | Voice | The transaction requires voice confirmation of registered user phone number. |
| | ...more... | |
| Notify | | Notify user of the transaction. |
| | Email | Via email. |
| | Voice | Via phone message. |
| | Agent | Via agent pop-up dialog. |
| | ...more... | |
| Fail | System | System failure, e.g. PDP Database unavailable. |
| | User | User-specific failure, rule mismatch. |
| ...More... | ... | ... |

Similar to rules, logical AND and OR operators apply to actions.

For example, Auth=Voice AND Not=Email.

System Preferences—The system preferences table is used by the system operator to manage user's accounts and to set system-wide policies as appropriate to the role of being system operator. In terms of priority this table has priority over user preferences.

System Preferences

| Field Name | Field Value | Comments |
| --- | --- | --- |
| User ID | <value of user id> | User's user id |
| Account Status | Enabled/disabled | User account status, e.g. password reset required. |
| Transaction Limit | <numeric value> | User's allowed transaction amount limit |
| ...Other... | ... | ... |

PDP Database API—Since the data is stored in relational database, the PDP Database interface is any SQL (Structured Query Language )—compliant programming interface, e.g. JDBC (Java Database Connectivity API). Other non-SQL database can be supported through $3^{rd}$ party software that provides appropriate SQL wrappers.

User Connections Table—The Connections table has user ID (proxy account number) as the primary key. It resides in the PDP Database.

The PDP Portal writes to this table whenever a PDP Agent successfully authenticates and connects. The PDP Server reads from this table when it needs to contact user for authorization confirmation.

After the Rule Interpreter determines a match, the Request Handler formats the target action as SOAP message and transmits it through the live connection for the target PDP Agent to execute.

Connections Table

| Field | Attribute | Comments |
| --- | --- | --- |
| User ID | GUID | User's unique identifier |
| Host | Alphanumeric | PDP portal host |
| Port | Numeric | PDP portal port number |

User ID—Proxy Account Number

User ID, the proxy account number, is the primary key identifier for a user account with PDPS. It looks like a valid credit card number and conforms to the basic mathematical logic in its composition; namely, the mod-10 checksum algorithm as described in following sections.

Format—A User ID is a multi-digit identifier, composed of the following parts: prefix, number, check digit. The length of this identifier depends on the support of the processing network.

User ID Format

| Field | Attribute | Generation |
| --- | --- | --- |
| Prefix | Numeric | Fixed |
| Account number | Numeric | Generated |
| Checksum Digit | Numeric | Computed |

The prefix or first six digits typically is the BIN (Bank Identification number).

Generation—User IDs are generated by the mod-10 checksum algorithm described below. Given: User ID=prefix+number+check digit The prefix is fixed since it is the assigned BIN. The account number is generated to be unique within the assigned BIN which length is determined by the following:

length of account number=length of User ID−length of prefix−1

The account number can be chosen in a number of ways: random number generation with collision checking, increment on a base number, converting user's existing online ID into a number, etc. Once it is chosen, the check digit is computed by the following illustration of the mod 10 or Luhn algorithm:

Step 1: Starting from the right-most digit in the number, multiply it by 2.
Step 2: Repeat Step 1 for every other digit going left.
Step 3: Sum the values of the individual digits in the sequence formed by Step 2.
Step 4: Sum the values of the other digits in the number not used in Step 2.
Step 5: Add the two sums.
Step 6: Check digit is the difference to be added to the value in Step 5 to make it into a next multiple of 10.

Verification—User ID can be verified by the same mod-10 checksum algorithm with a slight modification in Step 1: Start with the second rightmost digit from a User ID. The value of taking mod-10 of the result from the steps, or remainder from dividing result by 10, from Step 5 should be 0.

Reference Implementation

The preferred embodiment comprises an Application Server with support for Enterprise Java Beans (EJB), e.g. BEA Systems' WebLogic Server, RDBMS, e.g. Oracle 8I, and XML/Java interface to ISO8583, e.g. jpos It should be noted that "jpos" is an open source implementation of ISO8583, available on the Internet at a site operated by jpos.org which is hereby incorporated herein by reference.

Alternative Mediated Embodiment

Figure 13:
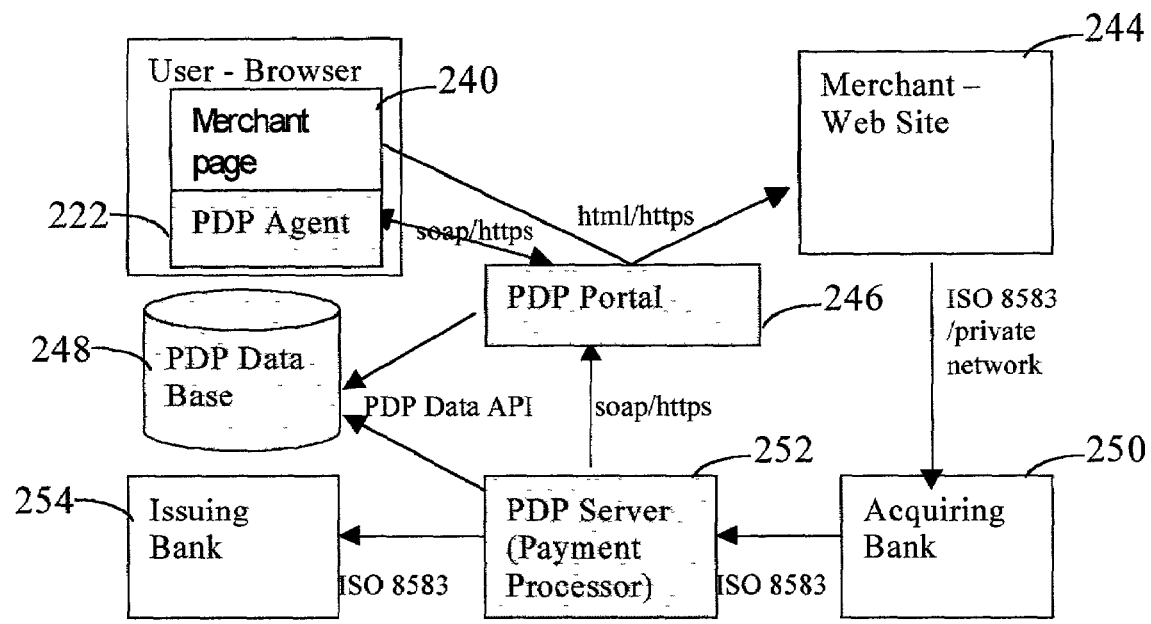
FIG. 13 is a flow drawing of a mediated PDPS system Architecture.

FIG. 13, shows another different embodiment of invention where the PDP Portal 246 mediates the user's interaction with the merchant 244. One advantage of this approach is that the user can hide his real identity from the merchant, as the Portal can substitute pseudo data into the requests sent to the merchant, thus achieving anonymous browsing. The agent is part of the page returning from the Portal. In browser technology terminology, the agent is a frame of a 2-frame main Web page, with the merchant page embedded in the second frame. Unlike the embedded agent approach, the entire Web page is served by the Portal.

In actual implementation, the user can turn mediation on and off from the agent. When mediation is turned off, the architecture becomes that of the embedded agent.

Sequence of Processing

Figure 19:
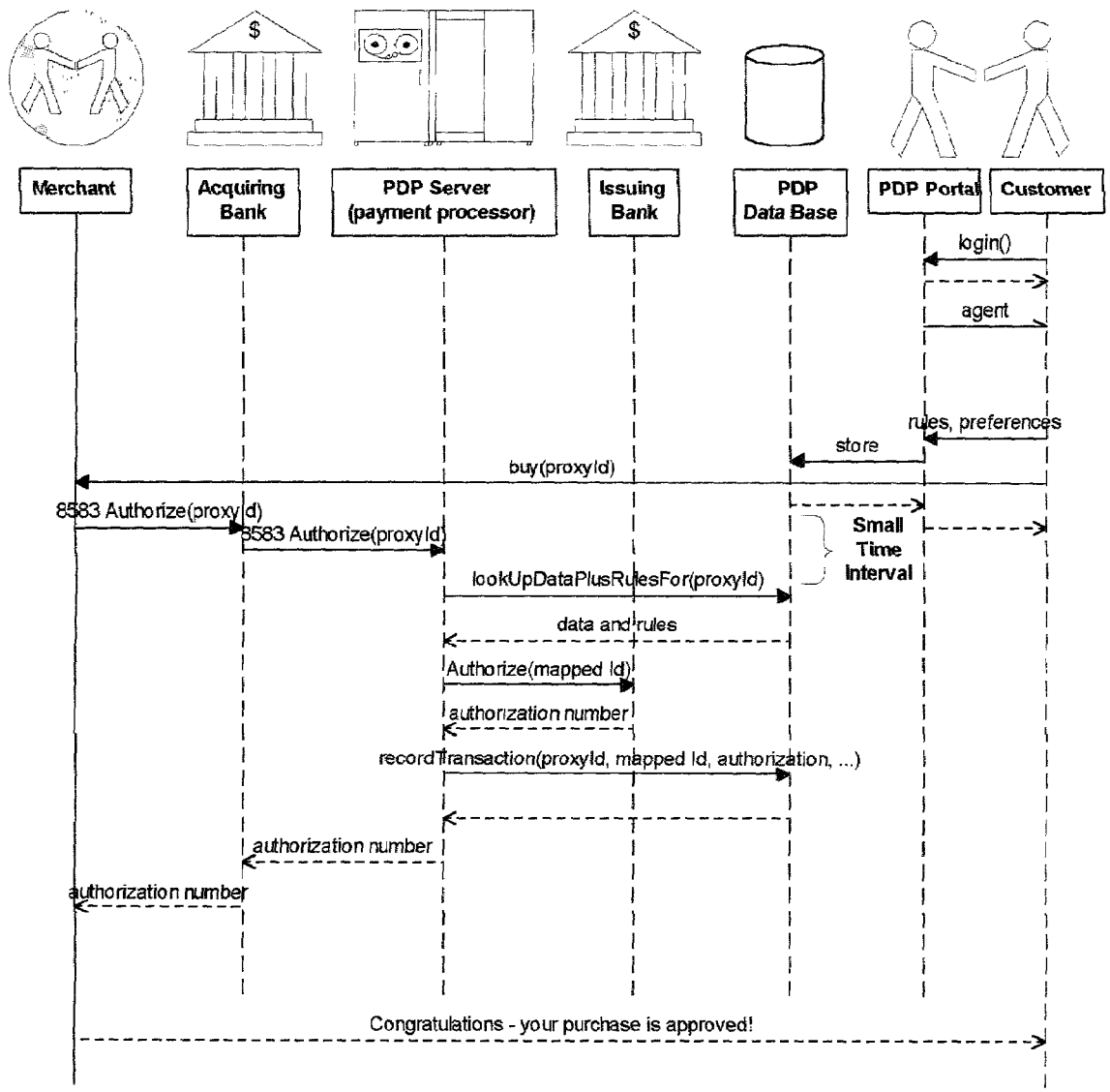
FIG. 19 is a sequence diagram in the Unified Modeling Language depicting operation of a PDP system in the automatic approval mode.

FIG. 19 is a sequence diagram showing the process involving the preferred embodiment as illustrated in FIG. 9 utilizing the Unified Modeling Language (UML) to show the timing and flow of information between the various entities. In these diagrams time is represented by changes in vertical position, starting at the top and progressing downward. Note that transactions which have a request and response are shown as a solid line ending in a double arrow which is the request, and an appositely directed dashed line ending in a double arrow which is the response. Single arrow solid lines are actions which do not require a response.

FIG. 19 depicts the "Automatic Approval" case where the Customer's Rules and Preferences allow the PDP Server to approve the purchase transaction without interacting with the customer during the approval process. The same seven elements shown in FIG. 9 are also shown here: the Customer, the PDP Portal, the Merchant, the Acquiring Bank, the PDP Server integrated with the Payment Processor, the PDP Database, and the Issuing Bank. Note that in actual implementation the PDP Database is potentially a distributed database system that can comprise multiple databases, and the PDP Database can also comprise various means for improving performance, such as sophisticated memory caching schemes. Note further that there are potentially three different Banks involved in a non-split transaction: 1) the Acquiring Bank, 2) the Bank that issued the PDP proxy card Id, and which may outsource payment processing, and 3) the Issuing Bank for the actual bank card to which the proxy card id is dynamically mapped. Note that the bank that issues the PDP proxy card id may be the same bank as the Issuing Bank.

The Customer logs into the PDP Portal, and the PDP Agent, embedded within a web page, is transmitted to the Customer. The Customer may need to update his rules and preferences so that the upcoming transaction will be approved automatically and with the desired bank card (assuming proper verification of the existence of the trusted 2nd channel between the Customer and the PDP Portal). The Customer issues a "Buy" command to the Merchant after providing proxy credit card information. The Merchant contacts the Acquiring Bank, which then contacts the PDP Server. The PDP Server gets data plus rules associated with the proxy credit card number from the PDP Database. Internal to the PDP Server, "Mapper" and "Rule Engine" modules determine that the transaction can be approved automatically, and determine which actual bank card to use for the transaction.

Now that the proxy credit card number has been mapped to a real bank card number, the PDP Server contacts an authorization service for the Issuing Bank to obtain approval. (Note: the Issuing Bank can be the same as the bank associated with the PDP Server, and then the authorization service for the Issuing Bank may be local to the PDP Server). The Issuing Bank's authorization service responds to the PDP Server with an approval message that contains an authorization number. The PDP Server records the transaction in the PDP Database, and replies to the Acquiring Bank. The Acquiring Bank now replies to the Merchant, and the Merchant notifies the Customer of the completion and success of the purchase transaction.

Figure 20:
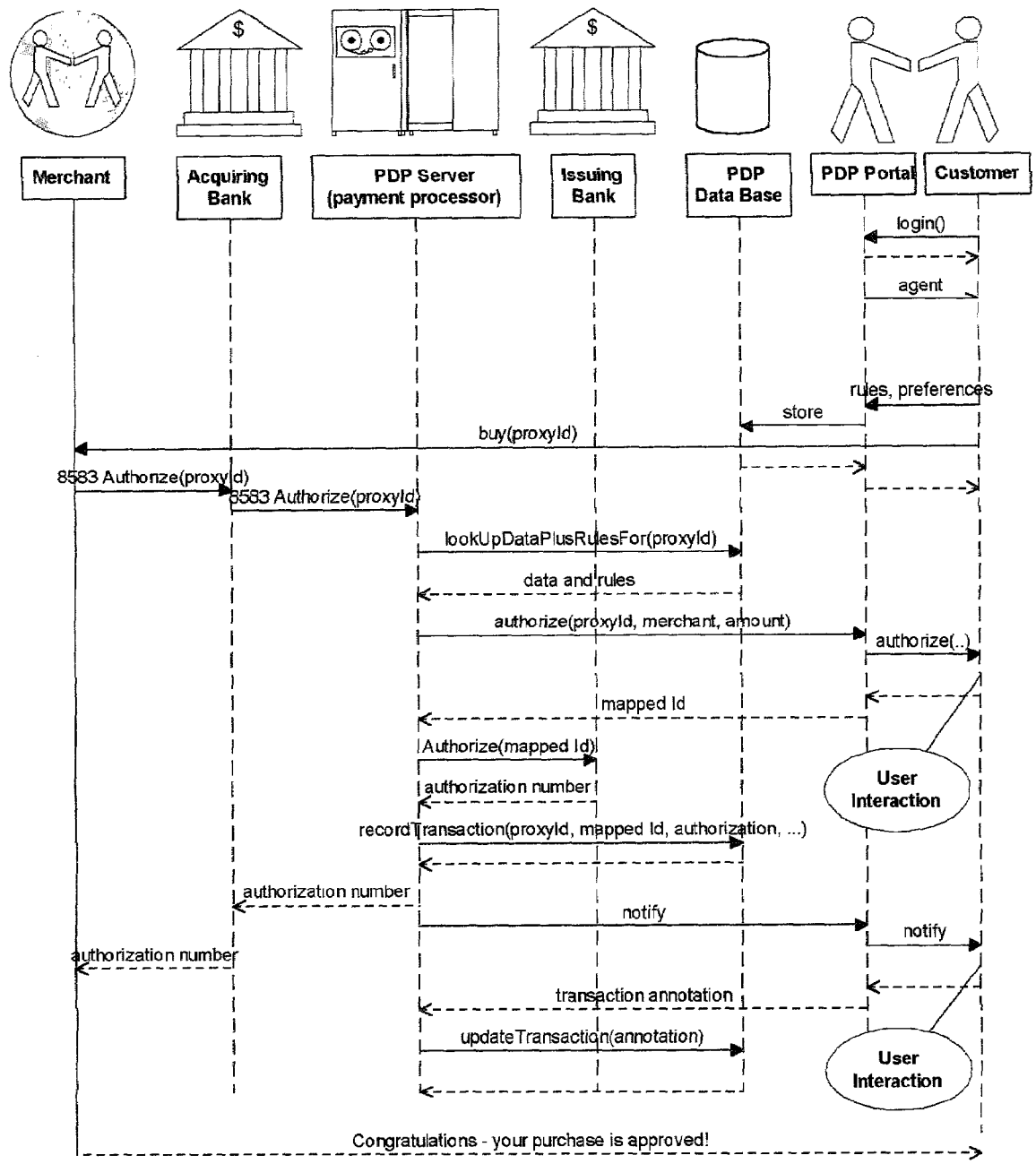
FIG. 20 is a sequence diagram in the Unified Modeling Language depicting operation of a PDP system in the interactive mode.

FIG. 20 is a sequence diagram depicting the "Interactive Approval" case where the customer approves the transaction in real-time. The Interactive Approval case follows much the same flow as the Automatic Approval case: the Customer logs into the PDP Portal, the Customer issues a "Buy" command to the Merchant after providing a proxy credit card number. Again the Merchant contacts the Acquiring Bank, and the Acquiring Bank contacts the PDP Server. This time, however, the PDP Server determines that it must contact the PDP Portal to obtain authorization from the Customer. Once the PDP Portal replies to the PDP Server with an actual bank card number (the mapped id), the transaction proceeds as before. As an additional step, however, we show in this scenario that after completion of the transaction the PDP Server notifies the PDP Portal so that the Customer can, if he chooses, annotate the transaction with additional notes about the purchase.

Timing

In FIG. 20, the ISO 8583 Authorization message from the Acquiring Bank to the PDP Server is a synchronous request, meaning that the Acquiring Bank waits for a reply. It is possible that the PDP Server may not reply quickly enough to the Acquiring Bank, and so the Acquiring Bank will "Time out." The possibility of a time-out from the Acquiring Bank is especially of concern for the "Interactive Approval" scenario, as the Customer may not respond quickly enough. There are several alternatives that will be recognized by those skilled in the art for handling the potential for Time Outs by the Acquiring Bank. The PDPS provides payment request timeout and retry functions. In some cases it will be possible for the PDPS to instruct the Payment Processor to request re-sending of the original transaction information from the acquiring bank. A second alternative opportunity involves the fact that an Acquiring bank may retry a timed out transaction itself To take advantage of this opportunity the PDPS completes the approval transaction with the payer and records it in the PDP database. When a retry comes through, the PDPS recognizes that the transaction is already authorized, and returns the authorization to the Acquiring bank. A further alternative for handling a time out is to instruct the payer to complete the approval process, mark the transaction for automatic approval, and then press the "back" arrow on the payer's browser and press the "buy" button a second time. The PDPS processes the second instance of the purchase as "pre-approved" and complete the authorization within the allotted time. An alternative approach is Stand-in Authorization, where in the case of a late reply, PDPS and the payment processor stands-in (authorizes) the transaction to the acquirer. This approach can be followed for example, when the payment processor has prearranged to deduct funds from another cardholders account it can access.

Figure 21:
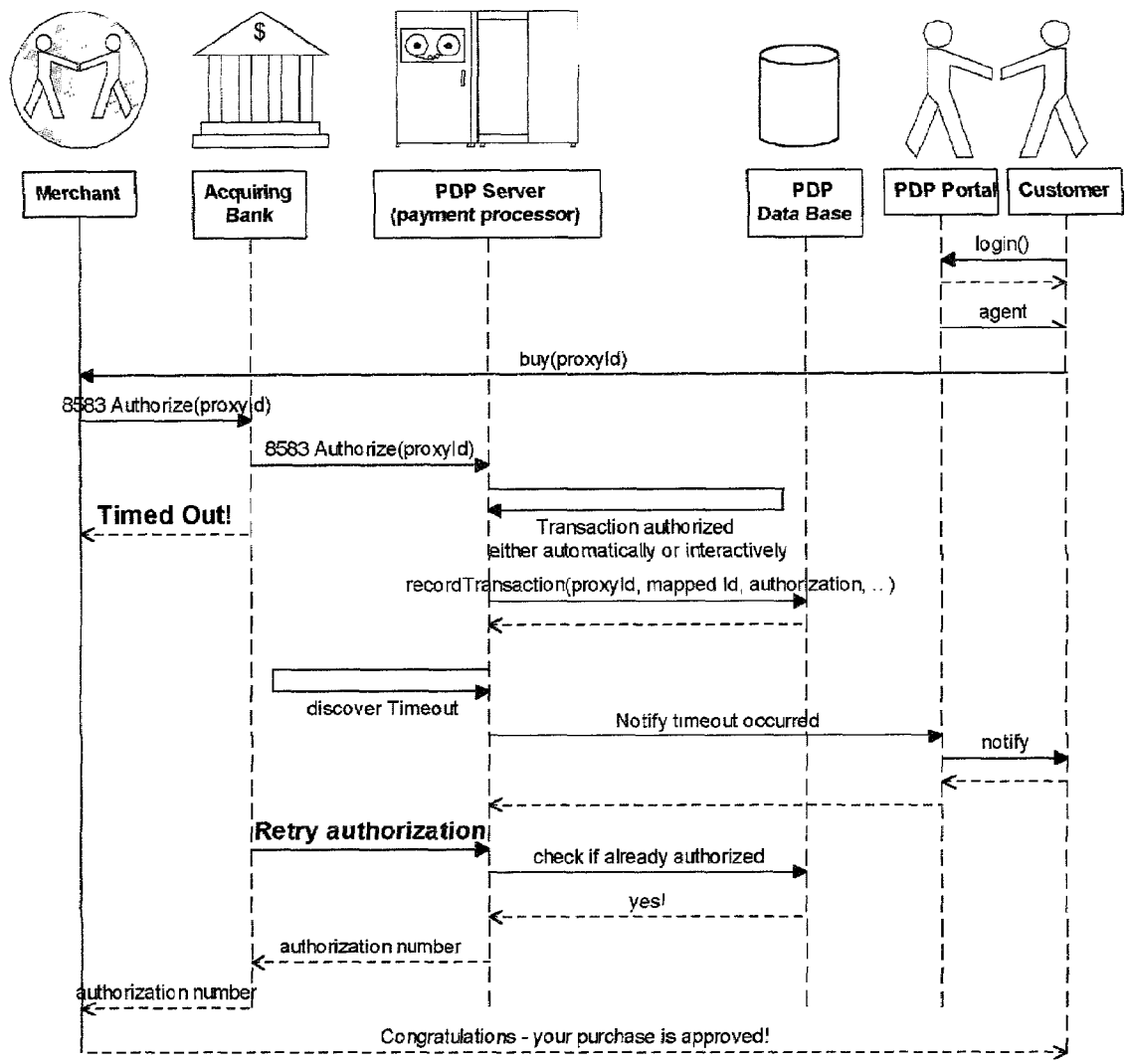
FIG. 21 is a sequence diagram in the Unified Modeling Language depicting operation of a PDP in an event where a "time out" occurred on an approval request.

FIG. 21 is a sequence diagram depicting a process involving the retry scenario described above. Referring to FIG. 21, the transaction begins as usual: the Customer logs into the PDP Portal, shops at a Merchant, and instructs the Merchant to "buy" after providing proxy credit card information. The Merchant sends a message to the Acquiring Bank, and the Acquiring Bank sends a message to the PDP Server. The details of the authorization process are not shown but follow FIGS. 19 and 20. The difference is that before the PDP Server is able to reply back to the Acquiring Bank, the Acquiring Bank times out. Nonetheless, the PDP Server completes the authorization transaction, and records the transaction in the PDP Database. When the PDP Server discovers that the Acquiring Bank has timed out, it notifies the Customer via the PDP Portal.

Meanwhile, the Acquiring Bank retries the authorization request, and again sends an ISO 8583 message to the PDP Server. The PDP Server checks with the PDP Store and determines that the transaction was already authorized, and returns the authorization number to the Acquiring Bank. The Acquiring Bank now returns to the Merchant, and the Merchant notifies the Customer of the successful completion of the transaction.

CONCLUSIONS

The invention provides a secure and convenient method, system and software which enables a purchaser to make on line payments to a merchant from financial accounts such as credit cards, debit cards, or checking accounts, in which the purchaser's account number and other confidential information need not be transmitted over the Internet or revealed to the merchant in an e-commerce transaction, thus providing anonymity and security to the transaction.

The method and system is an improvement that can be applied without the need to modify the existing infrastructure. A merchant need not adapt its site to accommodate the improvement, and need not even be aware of it. The purchaser is able to maintain dynamic control of the purchase after completing the transaction on the merchant's site. The purchaser may review and approve or disapprove of the transaction, may allocate payment to one or more accounts, and may protect privacy by varying the goods description record forwarded to the issuing bank.

The features increase the security and stability of the payment system providing protection to the system against organized attack by organized crime elements or terrorists.

Although the present invention has been described in considerable detail with reference to certain preferred versions thereof, other versions are possible. Therefore the spirit and scope of the appended claims should not be limited to the preferred versions herein.

The invention claimed is:

1. In a method of making a payment from a payer to a merchant over a public computer network of the type where the payment involves the merchant accepting a proposed payment in the form of an account number having a standard syntax from the payer at completion of a purchase, followed by the merchant requesting an authorization for the proposed payment from a financial institution, the improvement comprising the following acts:
   a) providing a trusted third party on line service which is accessible on the public computer network and which has access to an inter-bank computer network;
   b) the trusted third party on line service allowing a persistent channel to be established with the payer prior to completion of the purchase with the merchant, wherein the persistent channel is a two way electronic communication between the payer and the trusted third party, which is different from a channel used to communicate with the merchant, and which once opened is available for communication and verification until terminated;
   c) the trusted third party on line service obtaining a valid account number of the payer and authenticating the payer, wherein the valid account number is in the standard syntax;
   d) the trusted third party service examining the valid account number prior to completion of the purchase;
   e) if the valid account number does not contain a routing code which will direct it to the trusted third party on line service, then the trusted third party service assigning an alternative account number to the payer for a transaction, said alternative account number comprising a routing code which will cause the transaction to be routed to the trusted third party on line service when submitted by the merchant for authorization;
   f) if the payer requests an alternative account number when the persistent channel is established, then the trusted third party assigning an alternative account number to the payer comprising a routing code which will cause the transaction to be routed to the trusted third party online service when submitted by the merchant for authorization;
   g) the trusted third party on line service receiving the proposed payment submitted by the merchant;
   h) the trusted third party on line service verifying that the persistent channel with the payer remains available after receipt of the proposed payment;
   i) if the channel is not available, the trusted third party on line service issuing an instruction on the inter-bank network to decline the proposed payment with the merchant; and
   j) if the channel is available, the trusted third party on line service issuing an instruction on the inter-bank network to complete the proposed payment with the merchant from the valid account, whereby the payer is authenticated and the proposed payment is authorized, if at all, in a single integrated process conducted without the involvement of the merchant based on the persistent channel between the trusted third party on line service and the payer.

2. The improvement of claim 1 wherein the improvement further comprises the act of optionally contacting the payer over the persistent channel to obtain additional information.

3. The improvement of claim 2 wherein the trusted third party online service comprises a portal accessible on the public computer network through which the persistent channel may be established using a network accessible device.

4. The improvement of claim 2 wherein the trusted third party online service further comprises a telephone connection through which the persistent channel may be established.

5. The improvement of claim 2 wherein the transaction is an e-commerce transaction on the network, and wherein the transaction takes place between the payer's network accessible device and the merchant's world wide web site on the network.

6. The improvement of claim 4 wherein the purchase involves personal contact between the payer and the merchant.

7. The improvement of claim 1 wherein the trusted third party online service is the issuer of the account having the valid account number.

8. The improvement of claim 2 wherein the trusted third party service comprises an instant message system and the persistent channel is established over the instant message system.

* * * * *